Figure 1:
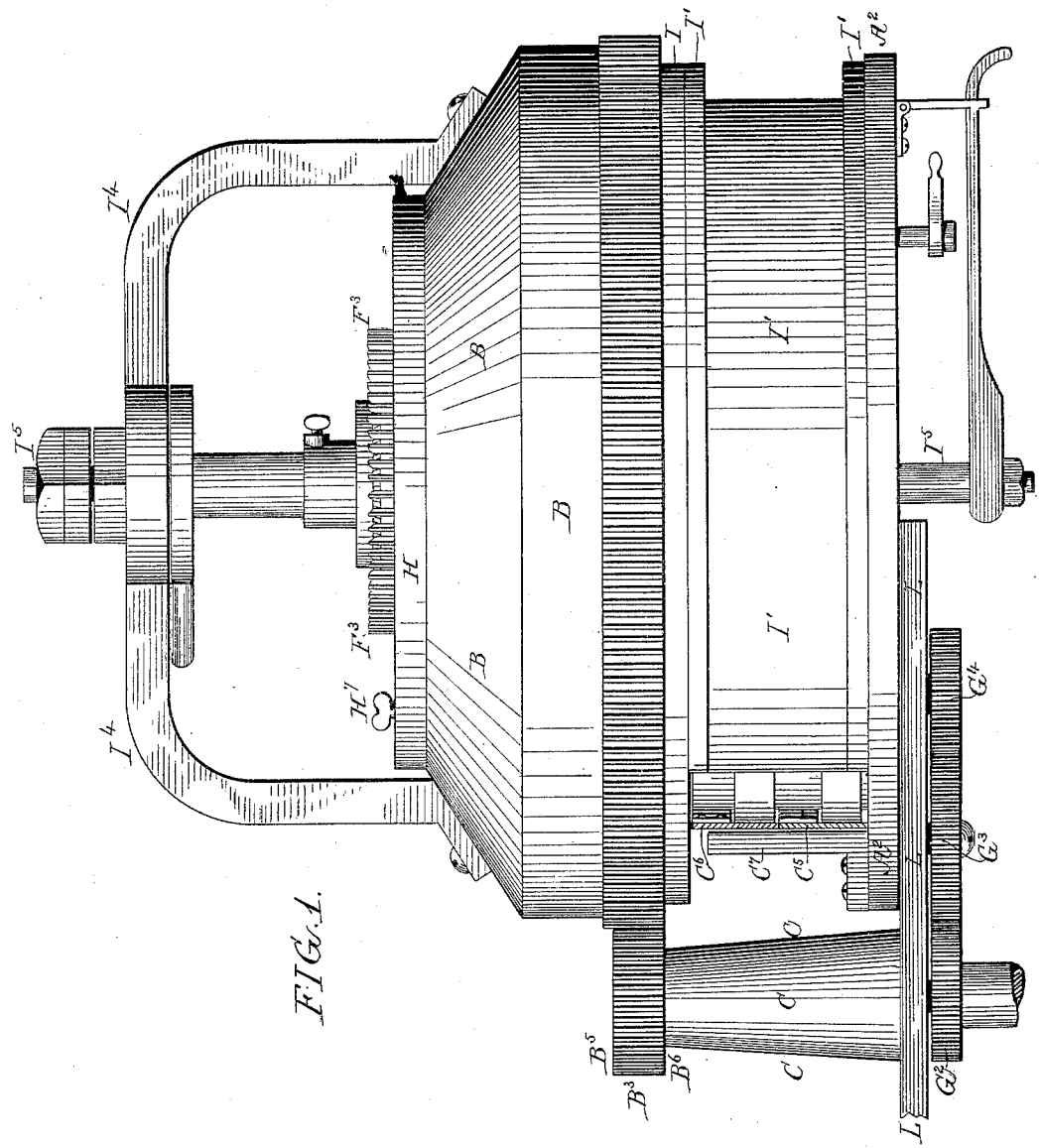

(No Model.) 15 Sheets—Sheet 2.

J. R. BRIDGES.
CIRCULAR KNITTING MACHINE.

No. 440,415. Patented Nov. 11, 1890.

WITNESSES:
Otto F. Gacherle
Wm. B. Bricker

INVENTOR
John R. Bridges
per Albert E. Gacherle
atty.

(No Model.) 15 Sheets—Sheet 3.
J. R. BRIDGES.
CIRCULAR KNITTING MACHINE.

No. 440,415. Patented Nov. 11, 1890.

WITNESSES: INVENTOR (No Model.) 15 Sheets—Sheet 4.

J. R. BRIDGES.
CIRCULAR KNITTING MACHINE.

No. 440,415. Patented Nov. 11, 1890.

WITNESSES:
Otto F. Jacherle
Jhm B. Bickler

INVENTOR
John R. Bridges
per Albert E. Jacherle
Atty.

(No Model.)
15 Sheets—Sheet 5.
J. R. BRIDGES.
CIRCULAR KNITTING MACHINE.
No. 440,415. Patented Nov. 11, 1890.
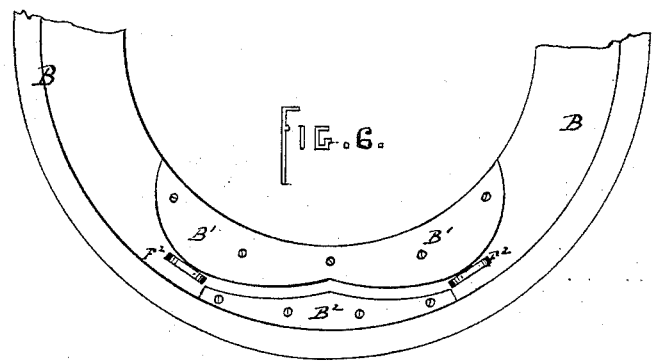
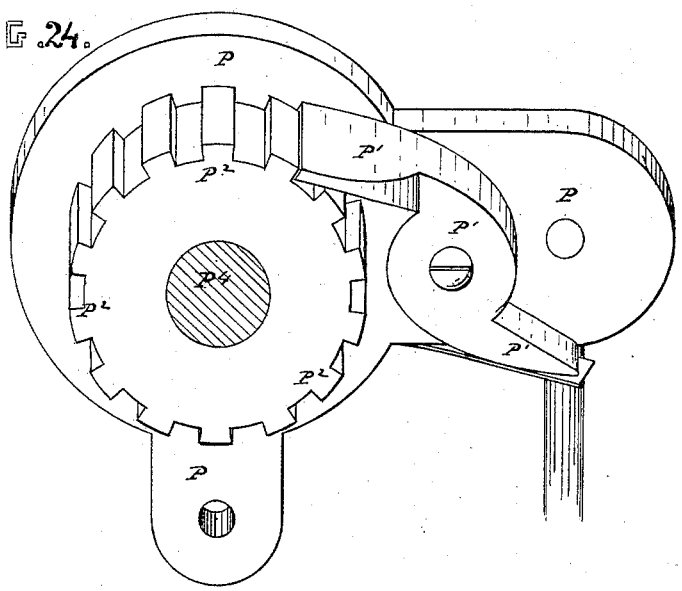
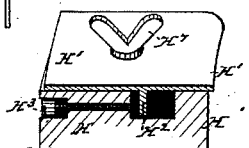
Witnesses
Ephraim Bucknall
Orville A. Bridges.
Inventor
John R. Bridges (No Model.)  15 Sheets—Sheet 6.

J. R. BRIDGES.
CIRCULAR KNITTING MACHINE.

No. 440,415. Patented Nov. 11, 1890.

Witnesses:
R. Schleicher
A. V. Groupe

Inventor:
John R. Bridges
by his Attorneys
Howson & Howson (No Model.)  15 Sheets—Sheet 7.
J. R. BRIDGES.
CIRCULAR KNITTING MACHINE.
No. 440,415.  Patented Nov. 11, 1890.
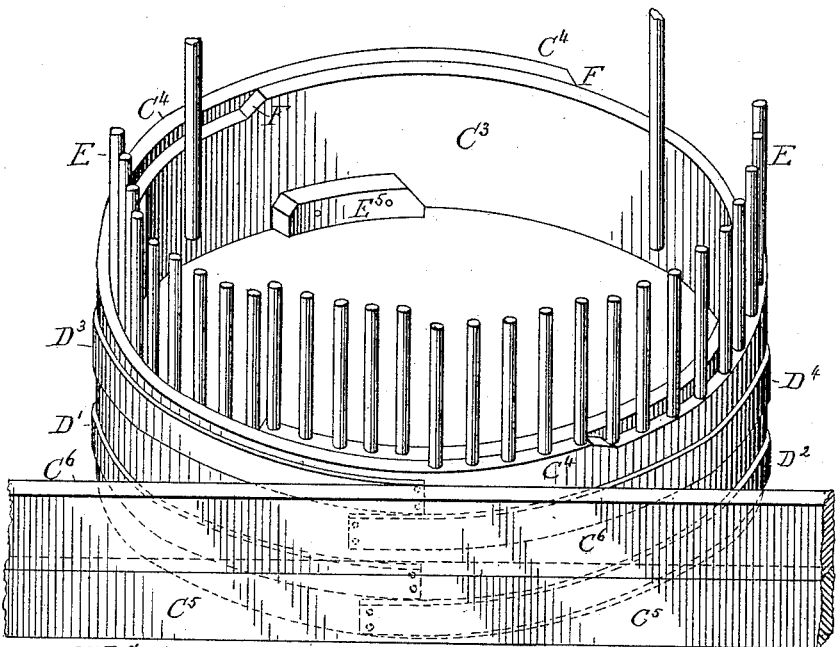
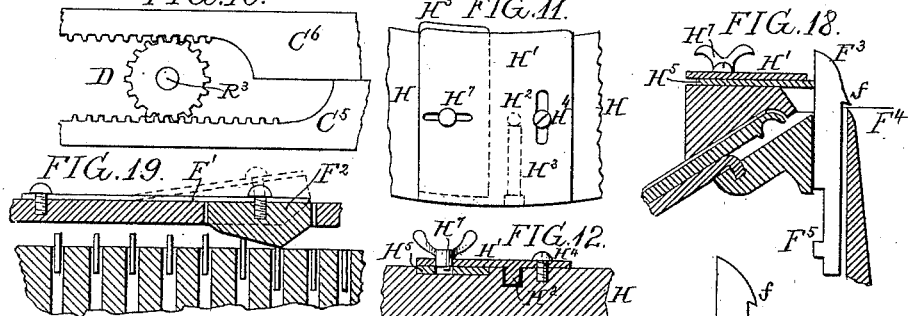
Witnesses:
R. Schleicher.
A. V. Groupe.
Inventor:
John R. Bridges
by his Attorneys
Howson & Howson

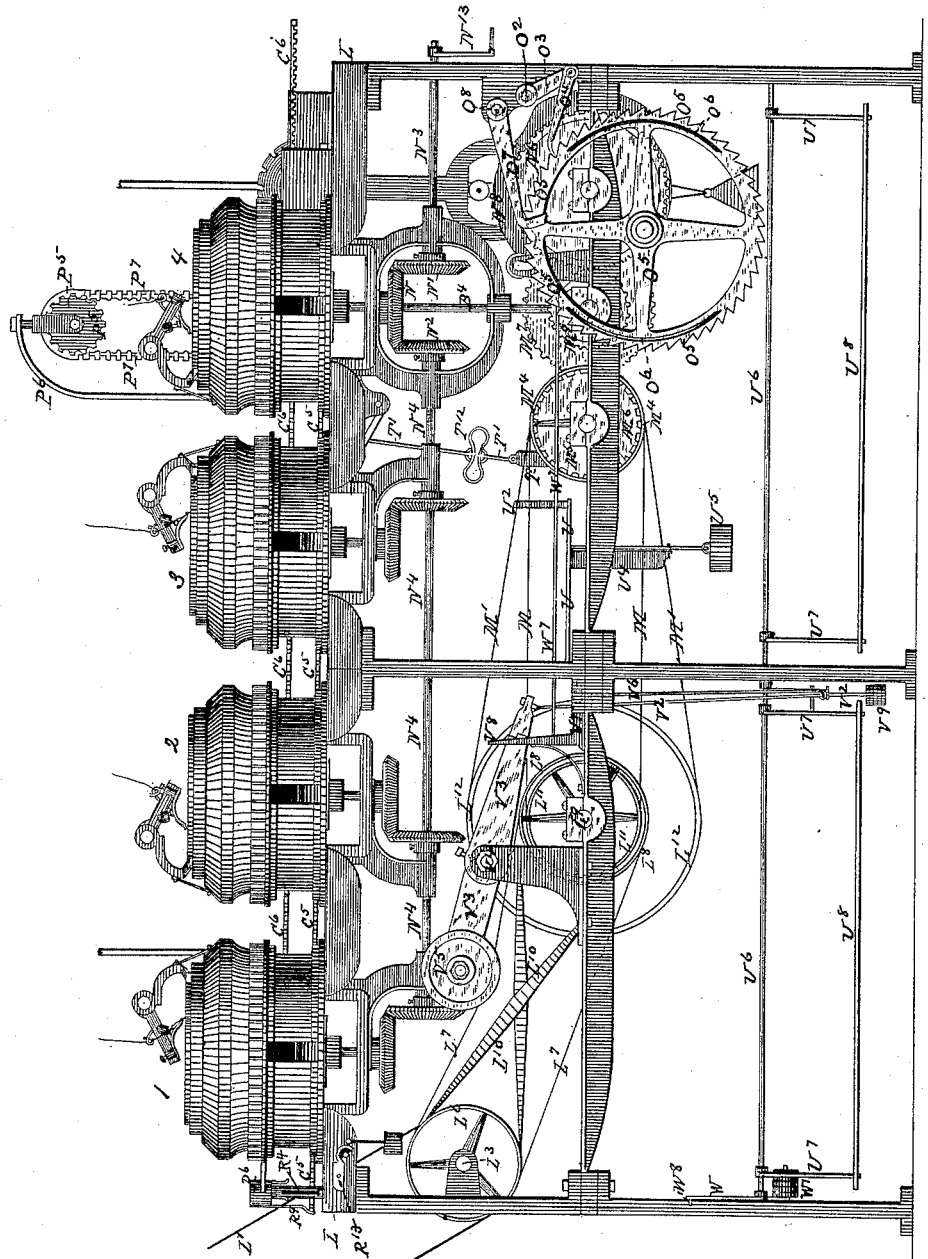

(No Model.)  
15 Sheets—Sheet 9.

J. R. BRIDGES.
CIRCULAR KNITTING MACHINE.

No. 440,415. Patented Nov. 11, 1890.

WITNESSES:

INVENTOR
John R. Bridges
per Albert E. Gacherle
Atty.

(No Model.) 15 Sheets—Sheet 10.
J. R. BRIDGES.
CIRCULAR KNITTING MACHINE.
No. 440,415. Patented Nov. 11, 1890.
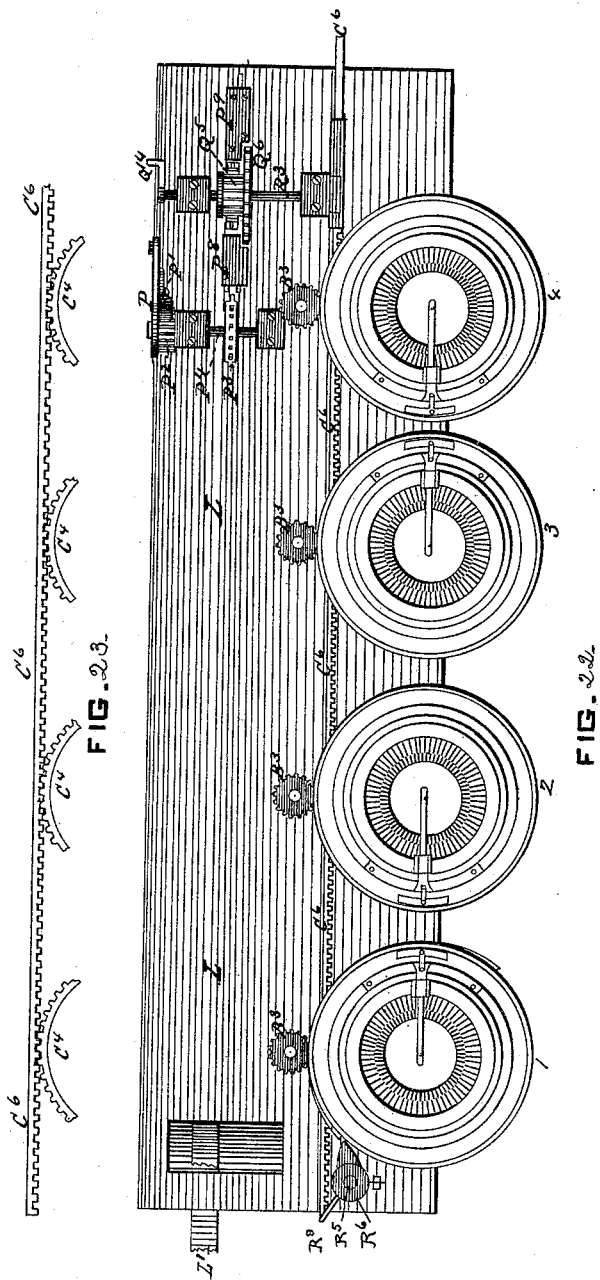
WITNESSES:
INVENTOR (No Model.) 15 Sheets—Sheet 11.

J. R. BRIDGES.
CIRCULAR KNITTING MACHINE.

No. 440,415. Patented Nov. 11, 1890.

WITNESSES:
Otto F. Zacherle
Wm. B. Bicker

INVENTOR
John R. Bridges
per Albert E. Zacherle
Atty.

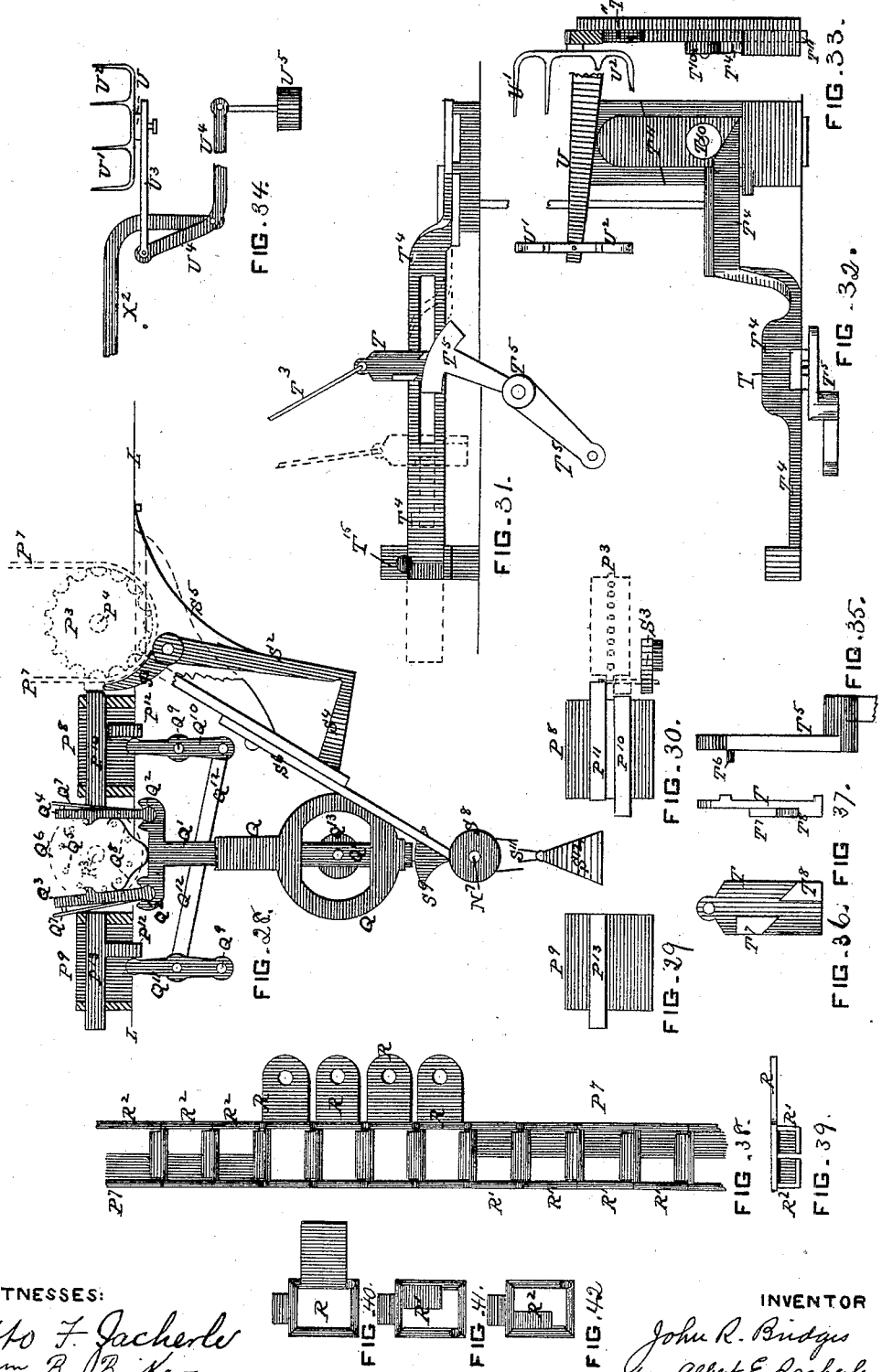

(No Model.) 15 Sheets—Sheet 13.
J. R. BRIDGES.
CIRCULAR KNITTING MACHINE.
No. 440,415. Patented Nov. 11, 1890.
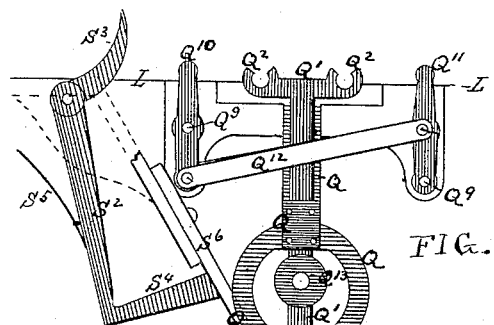
FIG. 43.
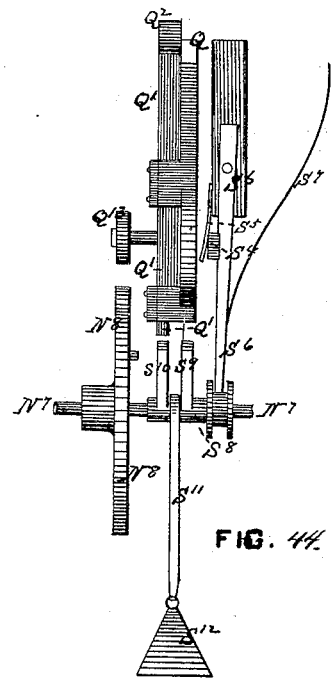
FIG. 44.
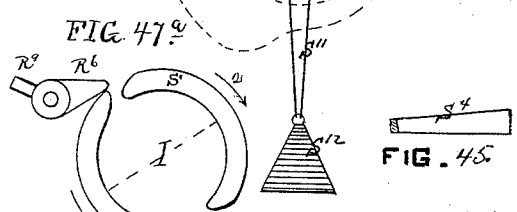
FIG. 45.
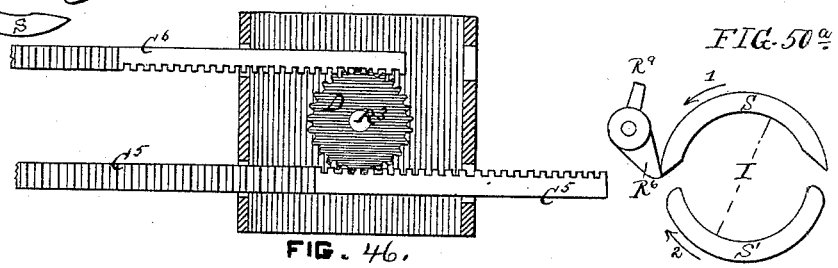
FIG. 46.
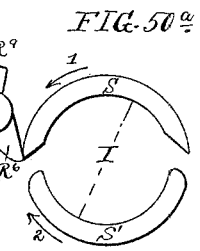
FIG. 50 ª
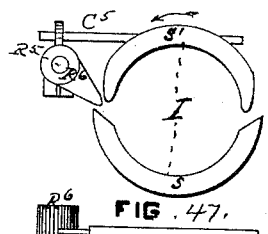
FIG. 47.
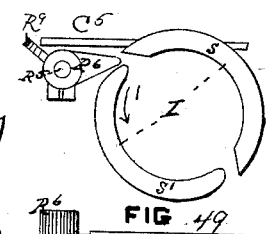
FIG. 49.
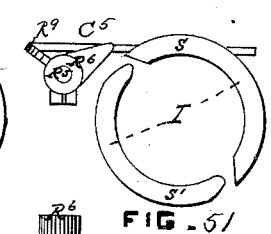
FIG. 51.
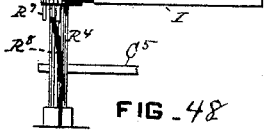
FIG. 48.
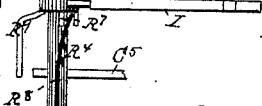
FIG. 50.
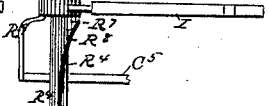
FIG. 52.
WITNESSES:
Otto F. Zacherle
Wm. B. Bicker
INVENTOR
John R. Bridges
per Albert E. Zacherle
Atty.

(No Model.)  
15 Sheets—Sheet 14.
J. R. BRIDGES.
CIRCULAR KNITTING MACHINE.
No. 440,415. Patented Nov. 11, 1890.
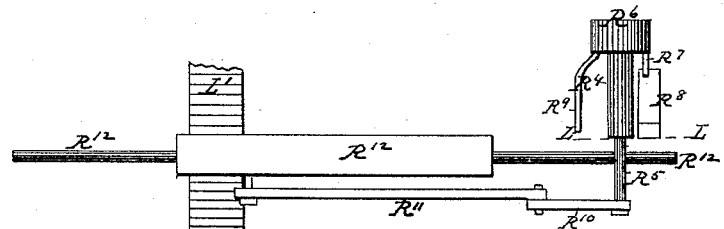
FIG. 53.
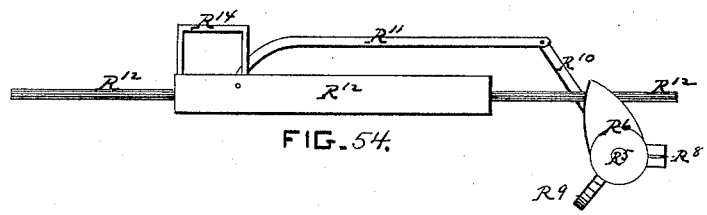
FIG. 54.
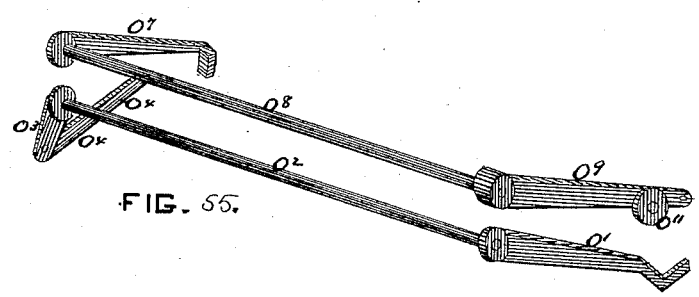
FIG. 55.
WITNESSES:  
Otto F. Jacharle.  
Wm. B. Bicker.
INVENTOR  
John R. Bridges  
per Albert E. Jacharle  
Atty.

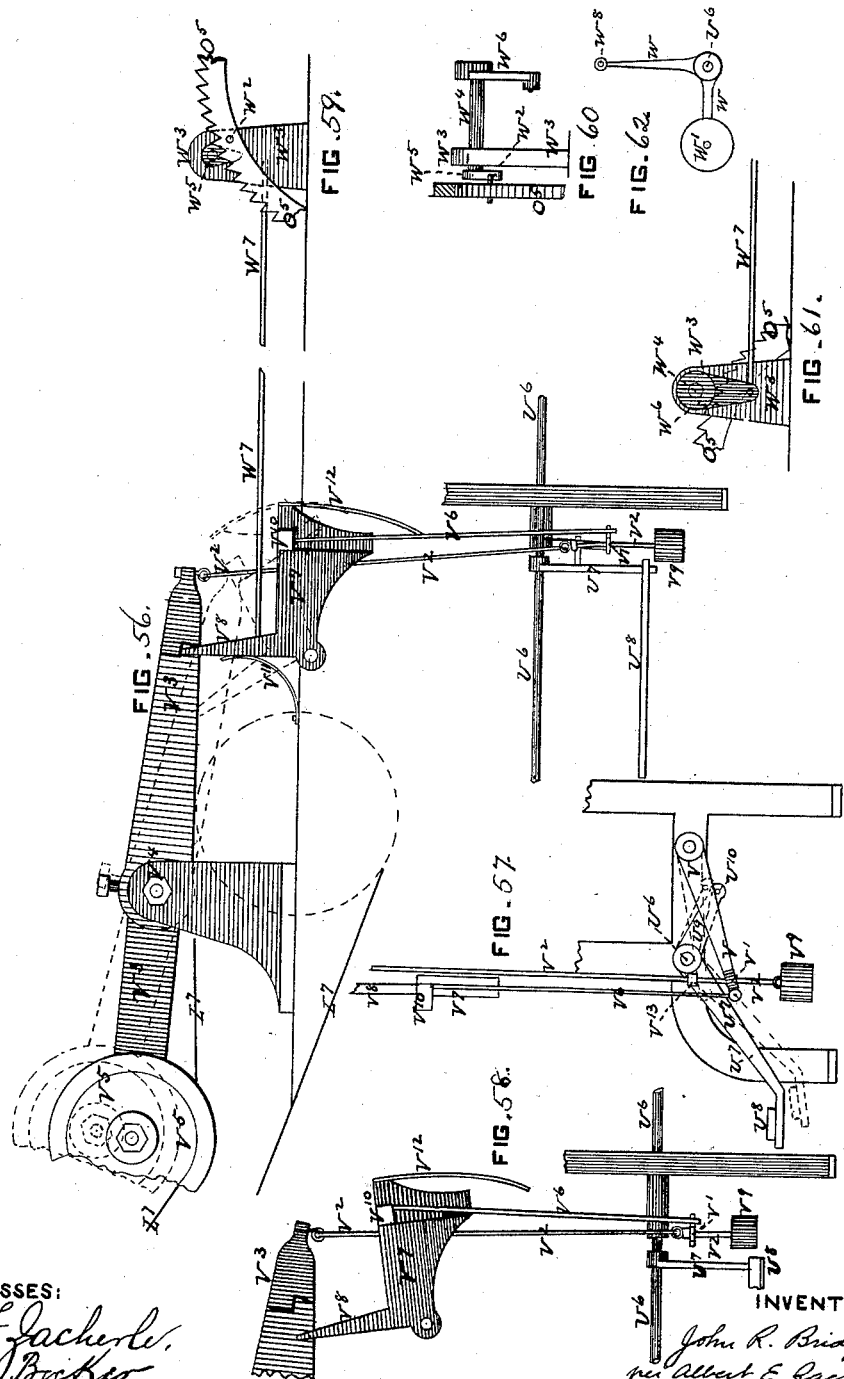

UNITED STATES PATENT OFFICE.

JOHN R. BRIDGES, OF PHILADELPHIA, PENNSYLVANIA.

CIRCULAR-KNITTING MACHINE.

SPECIFICATION forming part of Letters Patent No. 440,415, dated November 11, 1890.

Application filed January 6, 1883. Serial No. 81,097. (No model.)

*To all whom it may concern:*

Be it known that I, JOHN R. BRIDGES, a citizen of the United States, and a resident of the city and county of Philadelphia, State of Pennsylvania, have made certain new and useful Improvements in Circular-Knitting Machines, of which the following is a specification.

My invention relates more particularly to circular-knitting machines for making fashioned goods, in the course of the manufacture of which certain needles are at times necessarily thrown in and out of action; and my present invention consists of certain improvements upon, or, rather, a certain development, of the machine shown in my patent, No. 270,928, dated January 23, 1883, the character of the improvements being fully set forth hereinafter, and the novel features of said improvements being specifically claimed.

Figure 2:
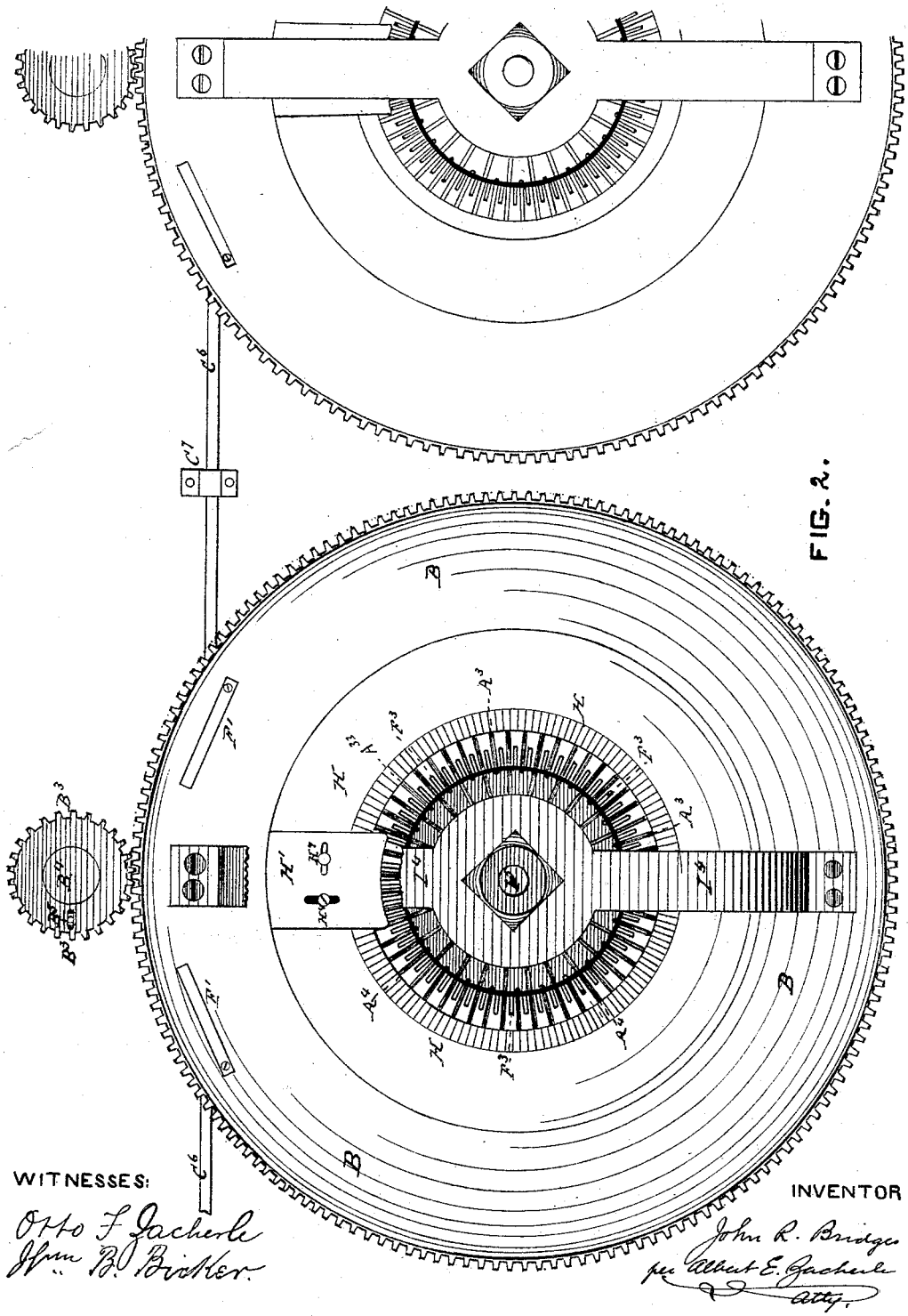
Figure 3:
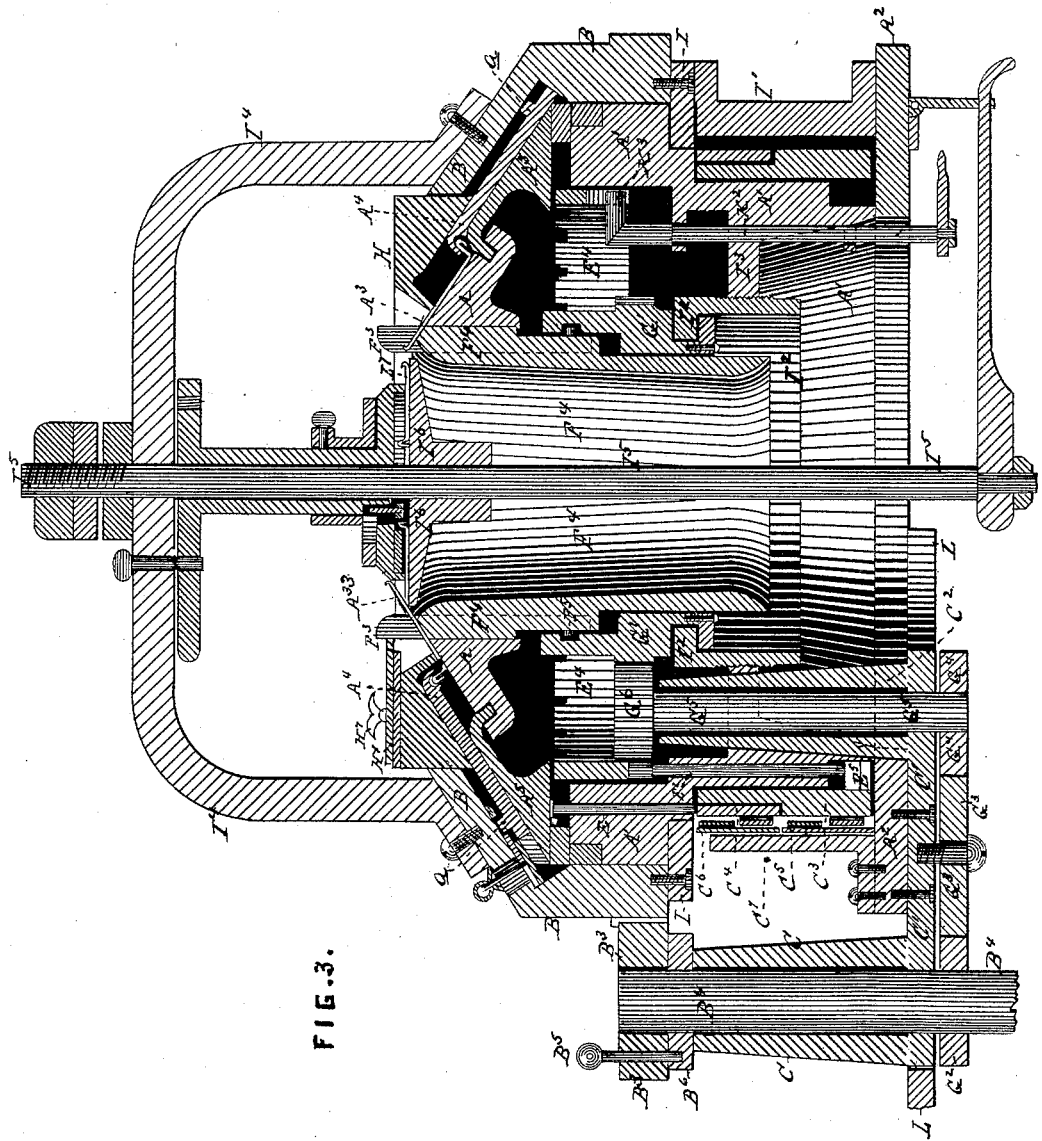
Figure 4:
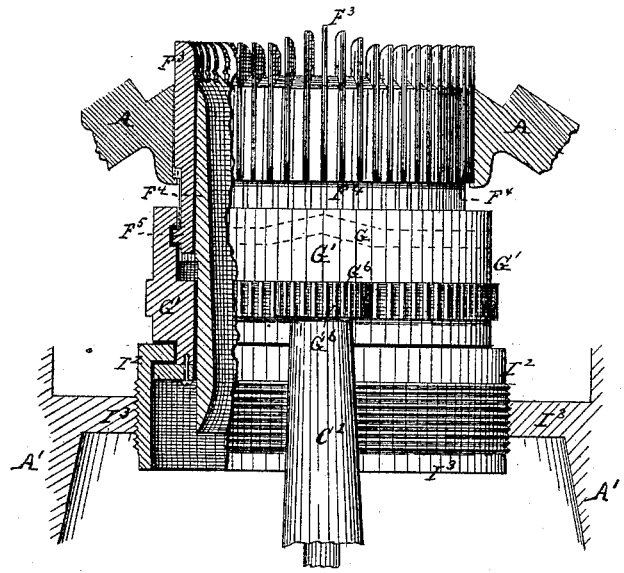
Figure 5:
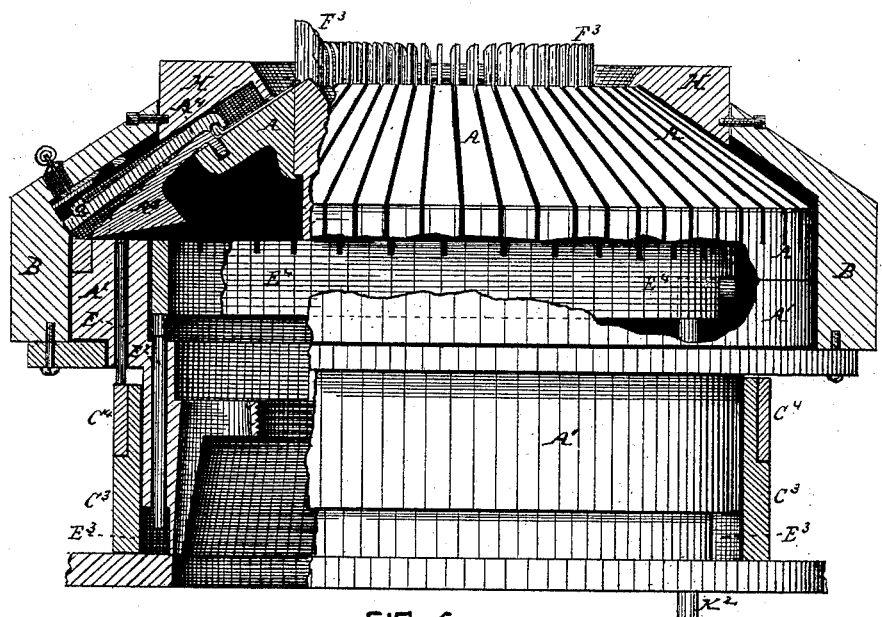
Figure 7:
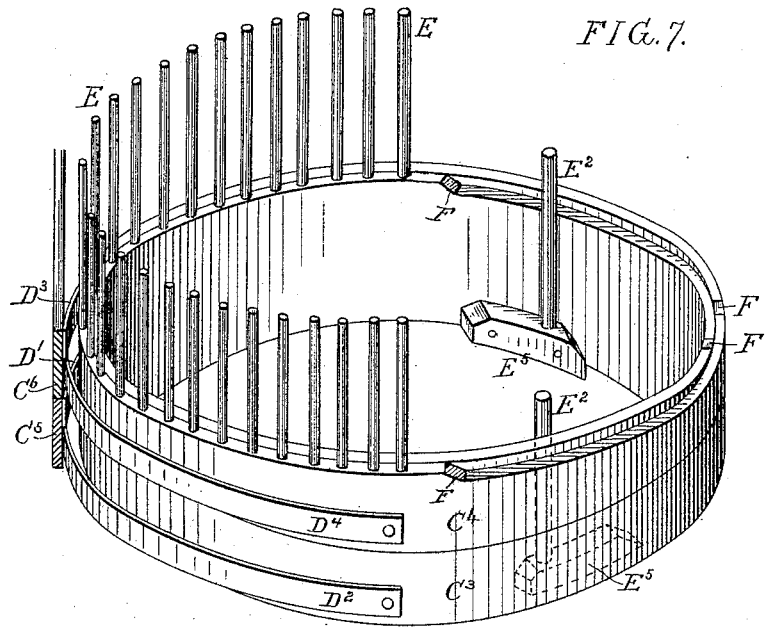
Figure 8:
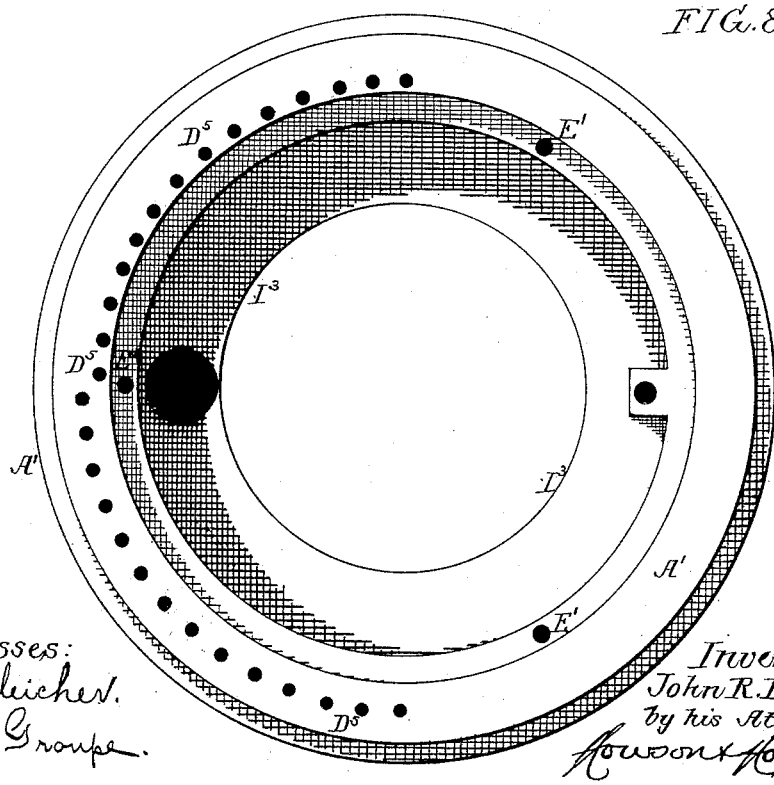
Figure 2I:
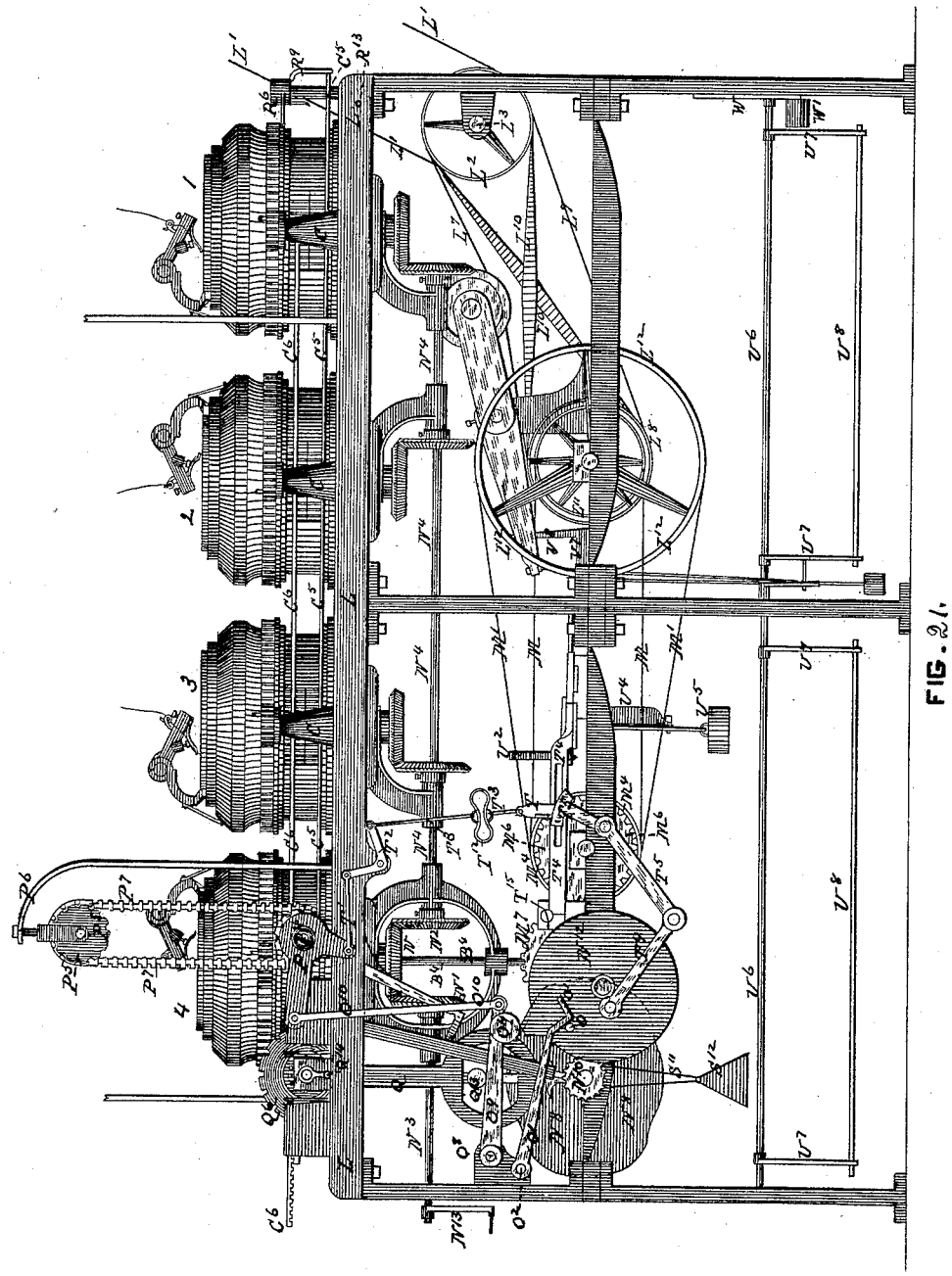
Figure 25:
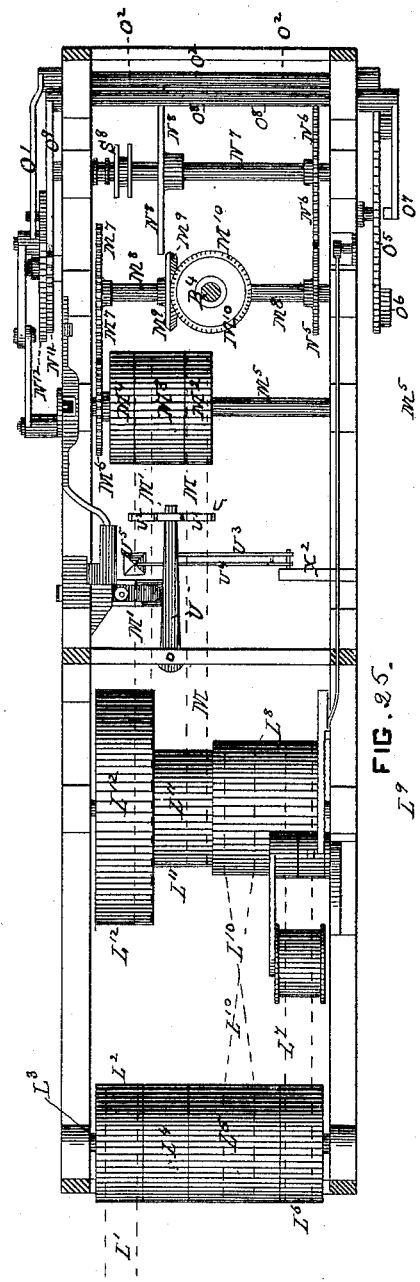
Figure 26:
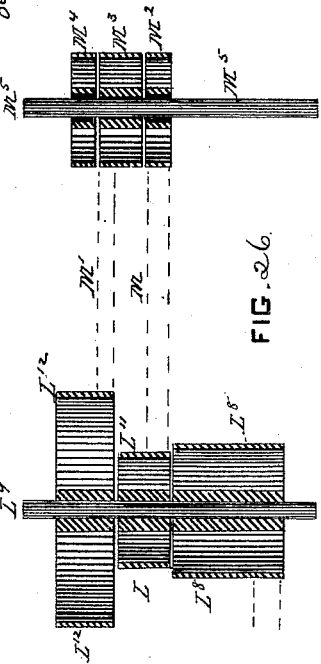
Figure 27:
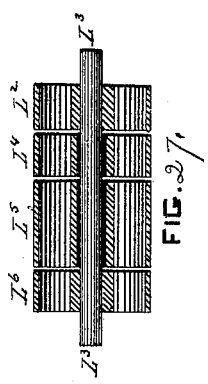

In the accompanying drawings, Figure 1 is a side elevation of the "head" or knitting-machine proper, showing in connection therewith a ribbing attachment and also the pinion for actuating the needle-jack cam-ring. Fig. 2 is a top view of the same, the arch supporting the ribbing attachment being broken away to show more fully a loop-adjuster on the head, the view showing also a fractional part of an adjacent head. Fig. 3 is a vertical sectional view of the head, the parts occupying the position which they assume when the machine is knitting tubular work. Fig. 4 is a view, partly in section and partly in elevation, of the hook-bed and hook-cam ring, showing also the actuating-pinion for said ring. Fig. 5 is a like view of a head without the ribbing attachment, showing more particularly the needle-bed, jack-ring, and bed-ring. Fig. 6 is a view of the under or inner side of the needle-jack cam-ring, showing the operating-cams and the lobes of the jack-springs at each end of the camway. Fig. 7 is a perspective view of the reciprocating rings and bars with the jack-lifting pins, dogs or lifting-blocks, and jack-ring pins in position for knitting round and round, so as to produce tubular work. Fig. 8 is a top view of the bed-ring, showing the openings through which pass the jack-lifting pins and the jack-ring pins, respectively. Fig. 9 is a perspective view of a portion of the reciprocatory bars and rings, showing the position of the jack-lifting pins and ring-lifting pins and of one of the lifting-blocks during to-and-fro knitting for the formation of a toe or heel pocket. Fig. 10 is a detached view or elevation of part of the reciprocatory bars and their actuating-pinion. Fig. 11 is a detached top view of the loop-adjusting device. Figs. 12 and 13 are respectively a transverse section and a sectional perspective view of the same. Fig. 14 is a detached view of the auxiliary plate of the loop-adjuster. Fig. 15 is a bottom view of the thumb-nut for operating said auxiliary plate. Fig. 16 is an elevation of said thumb-nut, showing also part of the main plate. Fig. 17 is an elevation of one of the hook-jacks. Fig. 18 is a sectional view showing the relation between the hook-jacks and the loop-adjuster. Fig. 19 is a sectional view of a portion of the needle-jack, cam-ring, and needle-bed, showing more fully the spring and lobe for forcing the unsupported needle-jacks below the surface of the needle-bed and out of operative connection with the operating-cams of said cam-ring. Fig. 20 is a front elevation of mechanism adapted to actuate and control the operative parts of a series of knitting-machines which are in their proper positions on the framework or bed. Fig. 21 is a rear elevation of the same. Fig. 22 is a top view of a platform or bed provided with a series of machines, showing their general relative arrangement. Fig. 23 is a detached top view of one form of the reciprocatory bars, showing the manner in which teeth upon the same may mesh with cogs or teeth upon the reciprocatory rings of such series of heads. Fig. 24 is a detached elevation of certain ratchet-and-pawl mechanism forming part of the controlling devices of the series of heads. Fig. 25 is a top view of the operating mechanism, the bed-plate being removed, this view showing particularly the arrangement of the belts and pulleys for changing the direction of the movement of the cam-ring and parts connected therewith, and showing also the construction and arrangement of the shifting device and pulleys for effecting change of speed. Fig. 26 is a detached sectional view of the speed-changing pulleys. Fig. 27 is a like view of the pulleys for changing the direction of motion. Fig. 28 is a detached rear elevation of mechanism for actuating and controlling the action of a certain reciprocatory ratchet forming part of the operating mechanism of the machine. Figs. 29 and 30 are detached views showing the sliding bars of the reciprocatory ratchet mechanism and the relation between them and a pattern chain-wheel, which is shown by dotted lines. Fig. 31 is a side elevation of the mechanism for effecting change of speed. Figs. 32 and 33 are respectively broken top and end views of the same. Fig. 34 is an elevation of the belt-yokes and weighted bell-crank for actuating the same, in conjunction with the mechanism shown in Figs. 31 to 33. Fig. 35 is a detached view of a rocking shifter-arm forming part of the belt-shifting devices. Figs. 36 and 37 are rear and side elevations, respectively, of the shifter-block acted on by said arm. Fig. 38 is an elevation of the bearing-face of a portion of the pattern-chain employed in conjunction with the other operating mechanism. Fig. 39 is an end view of said chain. Figs. 40, 41, and 42 are detached views of the different links of said chain. Fig. 43 is a front elevation of part of the reciprocatory ratchet mechanism and the rocker mechanism for controlling the action of the pawl-lifter. Fig. 44 is a side elevation of the same, showing more particularly the construction and arrangement of the rocker. Fig. 45 is a detached top view of part of the rocker-wedge. Fig. 46 is a detached elevation of the reciprocatory bars at one end and their actuating-pinion, showing the bars provided with teeth for meshing with like teeth on the periphery of the reciprocatory rings, as shown in Fig. 23. Figs. 47, 48, 49, and 50 are top views and elevations, respectively, of the tappet and tappet-ring, which control the mechanism for shifting the belt to change the direction of motion of the jack cam-ring, the parts being in the position which they occupy during to-and-fro knitting. Figs. 47$^a$ and 50$^a$ also show top views of the tappet and ring. Figs. 51 and 52 are respectively a top view and an elevation showing the position of the tappet and tappet-ring during round-and-round knitting. Fig. 53 is a detached elevation of the belt-shifting mechanism for changing the direction of motion of the jack cam-ring. Fig. 54 is a top view of same with the pulleys removed. Fig. 55 is a detached perspective view of part of the mechanism for actuating the fashioning-wheel and reciprocatory ratchet mechanism. Fig. 56 is a detached front elevation of the stopping and starting mechanism. Fig. 57 is a side elevation of part of the same. Fig. 58 is a front elevation of same, showing the parts in position to stop the machine. Figs. 59 and 60 are front and side elevations, respectively, of a segment of the fashioning-wheel and automatic stopping mechanism controlled thereby. Fig. 61 is a rear elevation of said mechanism, and Fig. 62 is a view of the weighted bell-crank for arresting the upward movement of the stopping and starting treadle.

A, Figs. 3 and 5, is the needle cone or bed mounted on a bed-ring A′, which in turn rests upon the head-plate A$^2$, the latter being bolted or otherwise secured to the bed-plate or platform L of the supporting-frame of the machine.

The needle cone or bed A is provided with a series of grooves or slots, as shown in Fig. 5, and in each of these slots is a needle A$^3$. To the foot of each needle is hinged or pivoted a needle-jack A$^4$, which is provided with a lug or projection $a$, and slides upon and is supported by a lifting-jack A$^5$, the latter being swung from the needle-bed A, as shown, or it may be hinged or pivoted thereto, or may be made a part of its corresponding lifting-pin, hereinafter mentioned.

B, Figs. 1, 2, 3, and 6, is the needle-jack-actuating cam-ring provided, as shown in Fig. 6, with the cam-plates B′ and B$^2$, set face to face and forming a cam groove or way, which, as said ring is actuated, engages with the lug $a$ of each and every needle-jack that projects above the surface of the needle-bed A, and thus actuates said jacks and their attached needles. The cam-ring B is also provided upon its outer periphery with spur-teeth, Figs. 1 and 2, with which the pinion B$^3$ engages, so as to impart motion to said cam-ring. The pinion B$^3$ is keyed to a shaft B$^4$, Fig. 3, by means of a pin B$^5$, this pin passing through said pinion and into the collar B$^6$, shrunk upon or otherwise securely fastened to said shaft. The object of this arrangement is to permit of the stoppage of the machine by the withdrawal of such pin, so that where a series of machines are mounted upon one supporting-frame and actuated by a single set of operating devices, as shown in Figs. 20 and 21, any one or more of such machines may be stopped without interfering with the continued operation of the others. The collar B$^6$ of the shaft B$^4$ rests upon a sleeve C, and said shaft passes through and is braced by said sleeve, and is operated as hereinafter described.

The needle-jacks A$^4$, Figs. 3 and 5, as already stated, rest and slide upon corresponding lifting-jacks A$^5$, and by the elevation or depression of the latter the needle-jacks are either raised sufficiently to cause the lug $a$ of each needle-jack to project above the surface of the needle cone or bed A into operative connection with the operating-cams of the ring B or are allowed to fall until said lugs $a$ are below the surface of the cone or bed A, whereby the action of the cam-faces B′ and B$^2$ of the ring B is avoided and the needles are allowed to remain inactive.

The machine is especially designed to knit fashioned goods, in the course of the manufacture of which it is necessary at times to throw certain needles out of action and afterward to bring the same needles again into action. The machines shown in the drawings are constructed to knit hosiery, in making the heels and toes of which one continuous half of the needles are simultaneously withdrawn from action, the cam-ring B being then given a reciprocating motion in lieu of the rotary movement imparted to it while knitting round and round to form the leg and foot, and at every successive passage of the cam during such to-and-fro knitting a needle is withdrawn at each end of the series still in action until but a few needles so remain in action, whereupon the operation is reversed, an additional needle at each end of the acting set being added to those already in action, until, finally, when all that were withdrawn singly at each end have been again brought into action singly the continuous half which was simultaneously withdrawn is in like manner simultaneously brought again into action and round-and-round knitting is resumed by imparting rotary movement to the cam-ring B.

As hereinbefore stated, I have heretofore obtained Letters Patent No. 270,928, dated January 23, 1883, covering devices for controlling the action of the needles of a knitting-machine. In my present machine I employ one form of the devices embraced in such patent—that is to say, reciprocatory rings, which are shown in perspective in Figs. 7 and 9 and in section in Figs. 3 and 5, and are therein lettered $C^3$ and $C^4$. Said rings are mounted one upon the other, as shown in said figures, and are located under the annularly-projecting ledge or shoulder of the bed-ring $A'$, through which extend the series of openings $D^5$, (shown in Fig. 6,) a number of these openings being arranged over the ring $C^3$ and the remainder over the ring $C^4$, so that a number of the lifting or jack pins E, as shown in Fig. 7, will rest upon the ring $C^3$ and the others upon the ring $C^4$.

$C^5$ and $C^6$, Figs. 3, 7, and 9, are reciprocatory bars actuated by the rotation or reciprocation of a pinion D, Fig. 10, the bars being moved first in one direction and then in the opposite, and motion being communicated from said bars to the rings $C^3$ and $C^4$ by connecting-straps $D'$, $D^2$, $D^3$, and $D^4$, riveted or bolted to said bars and rings, respectively, as shown in Figs. 7 and 9, or said rings may be provided upon their outer peripheries with spur-teeth, with which like teeth upon said bars $C^5$ and $C^6$ mesh, as shown in Fig. 23, the construction of such toothed bars being more fully shown in Fig. 46. The bars $C^5$ and $C^6$ are preserved in their proper position and relation to the other parts by braces $C^7$, Figs. 1, 2, and 3. The revolutions of the pinion D, and consequently the movements of the bars $C^5$ and $C^6$, are controlled by the mechanism hereinafter described. The lifting-pins E, already referred to, are arranged beneath and actuate a corresponding number of lifting-jacks $A^5$, as shown in Figs. 3 and 5, and the bed-ring $A'$, Fig. 8, is further provided with a second series of openings $E'$, through which a corresponding number of pins $E^2$, Figs. 3, 5, 7, and 9, depend into an annular recess $E^3$ of said bed-ring $A'$.

$E^4$, Figs. 3 and 5, is the jack-ring supported and actuated by said pins $E^2$, and being in turn arranged to actuate the lifting-jacks $A^5$, as hereinafter described.

Rigidly secured to the inner face of the ring $C^3$, Figs. 7 and 9, are the wedge-dogs or lifting-blocks $E^5$, corresponding in number to the pins $E^2$ and moving in the recess $E^3$ of the bed-ring $A'$, into which said pins depend, said dogs or blocks $E^5$ being so located upon the ring $C^3$ with respect to said pins $E^2$ that at certain times, as the rings $C^3$ and $C^4$ are actuated, the lifting-blocks pass under the lower ends of said pins $E^2$, and thus raise the latter simultaneously, and with them the jack-ring $E^4$, said ring $E^4$ and pins $E^2$ being allowed to fall by the withdrawal of said dogs or blocks $E^5$ from beneath said pins.

The jack-rink $E^4$, as shown in Figs. 3 and 5, is provided with a series of slots when it is desired to use in connection with the machine a ribbing attachment, as shown in some of the drawings. Such ribbing attachment, however, forms no part of the invention here claimed, and need not be further described herein. When the ribber is not used, the slots referred to in the jack-ring $E^4$ are dispensed with, the upper edge or surface of said ring being then plain and unbroken, so that in round-and-round knitting, as shown in Fig. 3, the lifting-jacks $A^5$ are supported and preserved in an elevated position, said ring itself having been raised by the pins $E^2$, under the lower ends of which the dogs or lifting blocks $E^5$ have been forced, as shown in Fig. 7, in which figure it will be noticed that the pins E rest upon the elevated edge or surface of the reciprocatory rings $C^3$ and $C^4$, respectively, which position the various parts retain during the continuance of round-and-round knitting, during which time the reciprocatory bars $C^5$ and $C^6$ and rings $C^3$ and $C^4$ remain at rest. The pins E are of such length that when thus elevated their upper ends are on a line with the upper edge of the jack-ring $E^4$, so that during round-and-round knitting the corresponding lifting-jacks $A^5$ are supported by both the ring $E^4$ and pins E. This general result, it will be evident, is attained by the proper arrangement of the dogs or blocks $E^5$ with respect to the ring-pins $E^2$, said blocks being located upon the face of the reciprocatory ring $C^3$, so as not to raise the ring-pins $E^2$ until the jack or lifting-pins E have been raised to the elevated surface of the respective rings $C^3$ and $C^4$ by the action of the latter, as hereinafter described. When the ring $E^4$ is elevated, all the lifting and needle jacks $A^5$ and $A^4$ will have thereby been raised and the lugs $a$ of the latter elevated above the surface of the needle-bed A into operative connection with the operating-cams of the cam-ring B, and the jacks and needles will thus be actuated at every passage of said cams.

When about to begin a heel or toe of a sock or stocking, it is, as already stated, first necessary to withdraw simultaneously one continuous half of the needles from action. This half of the needles in my machine is that half which is lettered $A^3$, and is actuated and controlled by those jacks $A^4$ and $A^5$ which are actuated and supported solely by the jack-ring $E^4$, the jacks $A^5$ of the fashioning-needles $A^{33}$, designed to knit the heel and toe, being supported by the jack-pins E, Figs. 3 and 7, as well as by said ring $E^4$. It will thus be evident that by a movement of pinion D in the proper direction a movement will be imparted to the bars $C^5$ and $C^6$, and thence to reciprocatory rings $C^3$ and $C^4$, that will withdraw the dogs or blocks $E^5$ from beneath pins $E^2$, Fig. 7, which latter, with the jack-ring $E^4$ and the jacks $A^5$ and $A^4$ not otherwise supported, will fall, and thus simultaneously withdraw the lugs $a$ of such jacks $A^4$ from operative connection with the operating-cams of the cam-ring B, as shown in Fig. 5, and one continuous half of the needles of the machine will thus be simultaneously withdrawn from action, the needles whose jacks are supported by the pins E, as well as by the ring $E^4$, still remaining in action.

As shown in Figs. 7 and 9, the upper edge of each of the rings $C^3$ and $C^4$ is divided into two sections, one being more elevated than the other, the ascent from the lower to the elevated section being by means of an incline F, so that when the pins E rest upon the elevated section they will support their corresponding lifting-jacks $A^5$ irrespective of ring $E^4$, as before described. The before-mentioned movement imparted to the pinion D is just sufficient to withdraw the blocks $E^5$ from beneath the ring-pins $E^2$, so that the pins E, which during round-and-round knitting have been resting upon the elevated surfaces of the rings $C^3$ and $C^4$, will still rest thereon.

During round-and-round knitting the cam-ring B, as in other circular machines, is rotated; but it must be reciprocated or given a to-and-fro motion when knitting the heel or toe, which change in the direction of motion I accomplish in the manner hereinafter described, the change from a rotary to a to-and-fro movement being simultaneous with the withdrawal of the blocks $E^5$ from beneath the ring-pins $E^2$ and the withdrawal of the continuous half of the needles from action. The position of the pins E upon the falling of the ring $E^4$, as shown in Fig. 7, is such that when upon the first reverse movement in its reciprocatory action the cams of the cam-ring B have passed the last of the jacks supported by said pins, and another partial revolution of pinion D in the same direction as before imparts a second movement to the bars $C^5$ and $C^6$, the pin E upon each ring $C^3$ and $C^4$ at the verge of the incline F is allowed to fall as the movement of said bars is communicated to said rings. This obviously withdraws a needle from action at each end of the series still in operation, the movement of the cam-ring B being then reversed and the elevated jacks $A^4$, with their attached needles, being again actuated. As the operating-cams of said ring pass the last of such jacks, another movement is imparted to the bars $C^5$ and $C^6$ by another partial revolution of pinion D in the same direction as before, thus effecting a further movement of the rings $C^3$ and $C^4$, so that another jack $A^4$ and its attached needle are withdrawn at each end of the fashioning series, and at every movement imparted to the rings $C^3$ and $C^4$ by the intermittent movement of the pinion D on each and every passage of the operating-cams of the cam-ring B a pin E at each end of the fashioning series will be allowed to fall and the corresponding needles withdrawn from action until, as shown in Fig. 9, but a few pins remain so elevated and a correspondingly small number of jacks and needles remain in action. The direction of movement of the pinion D is now reversed, and consequently the movement imparted by said pinion to the bars $C^5$ and $C^6$ and rings $C^3$ and $C^4$ is also reversed, and as the cam-ring B is reciprocated a pin E upon the lower section of each ring will be forced up the incline F to the elevated section at every passage of the operating-cams, thus bringing a jack $A^4$, with its attached needle, over each pin within the actuating influence of the said operating-cams until all the pins E again rest upon said elevated sections of the rings and the corresponding jacks and needles have again been brought into action. The reciprocatory rings $C^3$ and $C^4$ thus form an expanding and contracting cam for controlling the needles.

If it is desired to fashion on but a single needle in each course by actuating a needle first at one end and then at the opposite end of the fashioning-set, the rings $C^3$ and $C^4$ are simply located in respect to the pins E so that the incline of one ring will act in advance of that of the other. Hence after the first movement of the rings which effects the dropping of the pins $E^2$ and ring $E^4$, the next movement will effect the dropping of a pin E at one end of the fashioning-set, and after the passage of the cams a further movement of the rings will effect a dropping of the pin at the opposite end of the set, and so on, the pins being likewise elevated in succession in widening. The final movement of the rings $C^3$ and $C^4$ after all the jack-pins E have been used will force the blocks $E^5$ under the ring-pins $E^2$, and the latter, with the jack-ring $E^4$, will be again elevated, Figs. 3 and 7, thereby simultaneously bringing into action the jacks and needles previously withdrawn by the fall of said ring. The cam-ring B, simultaneously with the elevation of said ring $E^4$, is given a rotary motion in lieu of the reciprocatory movement previously imparted to it, and as all of the jacks A⁵ and A⁴ are now elevated the operating-cams of the said cam-ring will engage with each and every lug $a$, thus actuating each and every needle for round-and-round knitting. As the function of the lifting-pins E is simply to enable the cam-rings C³ and C⁴ to act upon the supporting-jacks A⁵ of the fashioning-needles, said pins may be regarded as mere guided extensions or continuations of said supporting-jacks and not necessarily as separate and detached elements.

The length of the leg and foot of a sock or stocking made by the round-and-round knitting in my machine is regulated by the pattern-wheel, hereinafter described.

To knit a sock or stocking upon my machine, I begin with the leg, the cam-ring B and parts connected therewith being rotated, during which operation the jacks A⁵ and A⁴ are all elevated, and the bars C⁵ and C⁶ and rings C³ and C⁴ remain at rest. Upon the completion of said leg the intermittent movements are imparted to said bars and rings, and by the to-and-fro operation, already described, the heel is knit, after which the foot is made by round-and-round knitting, and, finally, the toe by to-and-fro knitting, the various changes being made automatically by the pattern mechanism of the machine.

In order to insure perfect work, it is essential that the proper needles be withdrawn from and brought into action at the proper times, and to effect the certain withdrawal of the needles I secure to the cam-ring B, at each end of the cam-plates of the same, (see Figs. 2 and 6,) a spring F', provided with a lobe F², which projects through an opening in said ring, and by reason of the spring is caused to bear down upon the lugs $a$ of the needle-jacks A⁴, over which it rides, thus forcing down each and every jack that is unsupported and intended to be withdrawn from action; but while thus positively forcing down such unsupported jacks the lobe F² is free to rise up and ride over the jacks designed to remain in action, as shown in dotted lines in Fig. 19.

In lieu of weights for bearing down the knit fabric, I use a series of hook-jacks F³, constructed substantially as shown in Fig. 17, which are set in the grooves of a cylinder F⁴, (shown in Fig. 4,) said cylinder being suspended in position within the needle-bed A, as more particularly shown in Fig. 3. At its upper end each jack is provided with a hook $f$ and near its lower extremity with a lug or projection F⁵, which engages with the cam way or groove G of the hook cam-ring G', by the operation of which cam-ring the said hook-jacks receive an up-and-down movement, whereby the hook $f$ of each is enabled to engage with the loop upon the respective needle, in the manner hereinafter more particularly set forth.

Motion is communicated to the hook cam-ring G' from the cam-pinion shaft B⁴, Fig. 3, by means of pinions G² G³ G⁴ G⁶ and shaft G⁵, the pinion G² being keyed to or shrunk upon the shaft B⁴, the pinion G³ being hung to the plate C', the pinion G⁴ being keyed to or shrunk upon the lower end of the shaft G⁵, and the pinion G⁶ being carried by the upper end of said shaft and meshing with the spur-teeth upon the periphery of the hook cam-ring G', so that the needle-jack-actuating cam-ring B and hook cam-ring G' operate in unison, both rotating as shaft B⁴ is rotated and reciprocating as said shaft is reciprocated. Each hook-jack F³ is so constructed that when forced to its lowest position by the cam-ring G' during the operation of the machine its hook $f$ falls below the knitting-line, the new loop being formed above it; but the actuating-cams of rings B and G', as also the intermediate gearing hereinbefore described, are relatively arranged, as will be understood by those skilled in the construction of machines of this class, so that when a needle by the action of the cams of said ring B shall have been retracted sufficiently to cast its old loop, thus forming a new one, the corresponding jack through the cam of ring G' receives a quick reciprocation that first forces its hook $f$ above said new loop and then down upon the same, which position said jack retains throughout the rotation or reciprocation of the cam-ring B, and until said needle shall have again been actuated and retracted sufficiently to enable it to form another loop, casting off that still held by hook $f$, when the jack will again be reciprocated and its hook forced up above and then down upon the last-formed loop, as before.

The relative action of the single needle and jack described above, it will of course be understood, is that of each and every needle and jack in the head. By thus causing each jack F³ to act subsequently to the action of the needle in connection with which it operates it engages with the loops last formed instead of with the thread that is being fed to the needles, the tension upon said thread being removed, so that liability of the needle and thread being broken is greatly reduced, while the knitted texture is rendered more uniform and the fabric, as a whole, more springy and elastic.

It will be readily understood that the parts are so constructed that the hook-jacks act in the manner described both during the rotation of the cam-ring B for round-and-round knitting and during the reciprocation of said ring for to-and-fro knitting.

The pinion G⁶ and collar B⁶ rest upon sleeves C² and C, which are cast in one piece with the plate C' and bolted or otherwise secured to the head-plate A², the shafts G⁵ and B⁴, which pass through the sleeves, being thus upheld, braced, and kept in position by said sleeves. The hook-jacks F³ play between the needles, there being a like number of each, Fig. 2, and the grooves of the hook-cylinder F⁴ are made sufficiently deep, Fig. 18, to admit of a slight inward movement of the jacks therein, whereby the length of the loops of the fabric may be regulated and varied, as will presently be described.

Riding upon the needle-bed A, Fig. 3, is a ring H, secured to the cam-ring B and actuated therewith. This ring H serves to preserve the needles in position in their respective grooves, and secured to its upper face is the loop-adjuster, consisting of plate H', Figs. 11, 12, and 13, the inner edge of this plate being made concentric with the mouth of the head and having its opposite corners rounded, as shown. The plate H' is secured to the ring H by means of a screw H$^4$, which passes through a slot in said plate, this slot permitting the plate to be moved toward or from the central line or axis of the head. The plate H' is further provided with a lug or projection H$^2$, Fig. 13, which depends from its under surface and enters a recess or niche of the ring H, and against this lug bears a set-screw H$^3$, projecting from the exterior of said ring H. By easing up the screw H$^4$ and causing the screw H$^3$ to bear or press against the lug or projection H$^2$ the plate H' will be forced farther inward or toward the central line of the head, and, on the other hand, by retracting the screw H$^3$ the plate H' may be likewise retracted, said plate being secured in any desired position by tightening the screw H$^5$. As shown in the drawings, and more particularly in Fig. 18, the inner edge of the plate H' bears against the outer edges of the hook-jacks F$^3$, and as said plate is adjusted in the manner above described said jacks will either be forced toward the central line or axis of the head, thereby increasing the distance from the inner edge of each to the hook of the adjacent needle, and thus lengthening the loop to that extent, or the jacks will be permitted to yield to the pull of the loops on the needles, thus shortening said loops correspondingly, it being borne in mind that the inner edges of the hook-jacks mark or form the knitting-line, the length of the loop depending upon the distance from said line to the hooks of the needles when the latter occupy their lowest position in the needle-bed, so that by varying that distance by varying the position of the jacks, the length of the loops or texture of the fabric may be varied and regulated as desired. The inner corners of the plate H', as shown in Figs. 11 and 13, are rounded, so that whether the cam-ring B (and with it accordingly the loop-adjuster) is rotated or reciprocated the hook-jacks may easily be forced to the desired position. The loop-adjuster, it should be stated, is so located upon the ring H as to act in conjunction with those needles and hook-jacks which are immediately engaged in acting upon the knitting-thread.

Sliding beneath the plate H', Figs. 11 and 12, is an auxiliary plate H$^5$, provided with a slot H$^6$, as shown in Fig. 14, in which slot plays a pin projecting from the base of a thumb-nut H$^7$, which is hung, as shown in Figs. 12 and 16, to the plate H', said pin being located to one side of the axis of said nut, as shown in Fig. 15, so that as the latter is given a turn it throws the auxiliary plate H$^5$ toward or from the axis of the head. The object of this arrangement is to provide a means for throwing in a loose course of loops after the plate H' has been set or secured in position to regulate the general grade or texture of the fabric, since by giving a turn in the proper direction to the thumb-nut H$^7$ said auxiliary plate H$^5$ may be made to project beyond the inner edge of the plate H' and caused to bear against the jacks F$^3$. Hence the latter as the cam-ring B and loop-adjusting device are rotated or reciprocated will be forced still farther toward the central line or axis of the head and the loops lengthened accordingly. After the desired loose or slack course is thus thrown in the thumb-nut H$^7$ is reversed and the auxiliary plate H$^5$ withdrawn, whereupon the character of the texture will again be determined by the position of the plate H'.

I, Fig. 3, is a ring rigidly secured to the base of the cam-ring B and designed to hold said ring B down in position. Said ring I, as shown in Fig. 47, is made in two sections, and in addition to its function of preserving the cam-ring B in position it has an additional purpose, to wit: that of effecting, in conjunction with the tappet mechanism hereinafter more fully described, the reciprocating of said cam-ring B, as also hereinafter more fully set forth.

I', Figs. 1 and 3, is a segment or frame bolted to the head-plate, and upon this frame rides and is supported the ring I and the superstructure before described and shown in Fig. 3.

I$^2$, Figs. 3 and 4, is an adjusting-ring to regulate the vertical position of the hook-jacks, said ring fitting in the screw-threaded flange I$^3$ of the bed-ring A', and being provided with an annular flange projecting into a like groove or recess of the hook cam-ring G'. By rotating said ring I$^2$, therefore, it will be evident that the cam-ring G', and with it the hook-jacks, may be raised or lowered, as desired, this arrangement being particularly advantageous when setting up the machine to secure proper adjustment of the jacks with respect to the needles.

The hook-jacks F$^3$, in addition to their before-described functions, are also employed in lieu of the ordinary weights for bearing down the knit fabric.

I am aware that jacks have heretofore been employed in other knitting-machines for the latter purpose, the jacks being so arranged and actuated as to engage directly with the thread that is being fed to the needles, thus preserving said thread taut and in position upon said needles while the latter are being actuated to form the loop. My hook-jacks F$^3$, it will be evident, may, by the proper arrangement and construction of the cam whereby they are actuated with respect to the needle-jack actuating-cams, be made to engage directly with the thread, as just described; but I find it advantageous to vary this arrangement and cause the hooks $f$ of said hook-jacks $F^3$ on the descent of the latter to seize and hold the old loop and draw upon the same as the needles are retracted to form the new loops above said hooks.

The various parts hereinbefore described, and embraced in Figs. 1 to 19, inclusive, constitute the knitting-machine proper. I shall now proceed to describe my improved mechanism for automatically actuating and controlling the operative parts of such machine, confining the description of such mechanism in its operation and results to the machine at the extreme left of the series shown in Fig. 20, and at the right in Fig. 21, which machine is bolted or otherwise secured to the bed-plate or platform L of the supporting-frame.

Running from the main or driving pulley is a belt $L'$, Figs. 20, 21, and 25, which for round-and-round knitting passes over the fixed pulley $L^2$ on the shaft $L^3$. Upon said shaft are also loose pulleys $L^4$ and $L^5$ and a second fixed or tight pulley $L^6$. From the pulley $L^6$ a straight belt $L^7$ is run to a pulley $L^8$ on a shaft $L^9$, and from the pulley $L^5$ to said pulley $L^8$ runs a crossed belt $L^{10}$, the object of this arrangement being to reverse the movement of said pulley $L^8$ by actuating it at certain times from pulleys $L^5$ and $L^6$, alternately, as hereinafter further explained.

Fixedly mounted upon the shaft $L^9$, with the said fixed pulley $L^8$ and revolving therewith, are pulleys $L^{11}$ and $L^{12}$, and from said pulleys $L^{11}$ and $L^{12}$, respectively, are run belts M and $M'$ to a series of pulleys $M^2$, $M^3$, and $M^4$ on a shaft $M^5$, the pulleys $M^2$ and $M^4$ being loose on said shaft, while the pulley $M^3$ is fixed thereon and the belts passing over the loose or fixed pulleys, respectively, according as they are shifted by the belt-shifter U, as hereinafter explained.

Upon the shaft $M^5$ is rigidly mounted a pinion $M^6$, which meshes with a spur-wheel $M^7$, secured in like manner upon the shaft $M^8$, which is thereby actuated, and with it a bevel-gear $M^9$, which in turn meshes with a like gear $M^{10}$ upon the cam-pinion shaft $B^4$, which passes through the sleeve C, Fig. 3, and carries the cam-ring pinion $B^3$.

Upon the vertical shaft $B^4$, Figs. 20 and 21, is a second bevel-gear N, which meshes with like gears $N'$ and $N^2$ upon horizontal shafts $N^3$ and $N^4$, respectively. The shaft $N^4$ is connected by bevel-gears with the cam-pinion shafts of the other machines of the series, as shown in Figs. 20 and 21.

To the outer end of the shaft $N^3$ is secured a crank $N^{13}$, whereby it will be evident that the several shafts just referred to may be actuated by hand, an arrangement especially advantageous in setting up the machines and adjusting the various parts thereof.

Upon the shaft $M^8$, Fig. 25, is a pinion $N^5$, which actuates a gear $N^6$ upon a cam-shaft $N^7$, which carries the ratchet-cam $N^8$, rocker $S^8$, and pinion $N^{10}$, Fig. 21. This latter pinion meshes with a gear $N^{11}$, Fig. 25, secured to the inner surface of the chain-cam $N^{12}$, said gear $N^{11}$ and cam $N^{12}$ being pivoted to the supporting-frame in the position indicated in Fig. 21.

Upon the outer face of the cam $N^{12}$, Fig. 21, is a pin O, which as said cam is actuated vibrates the free end of a bent arm $O'$, which at its other end is rigidly secured to or mounted upon the shaft $O^2$. This latter shaft extends across the frame, as shown in Fig. 25, and carries the pawl-arm $O^3$, to which is pivoted the pawl $O^4$, which engages with the teeth upon the circumference of the fashioning-wheel $O^5$, so that as the cam $N^{12}$ is actuated the up-and-down or vibratory movement imparted by the pin O to the arm $O'$ will be communicated through shaft $O^2$ to the pawl-arm $O^3$ and pawl $O^4$, and the fashioning-wheel $O^5$ thus actuated, said fashioning-wheel being pivoted to the frame of the machine in the position indicated in the drawings. Upon the outer face of said wheel are the flanges $O^6$, Fig. 20, resting upon or dropping between the ends of which is the bearing-arm $O^7$, which is rigidly secured to one end of a shaft $O^8$, the latter also extending across the frame of the machine and at its other or rear end carrying the chain-arm $O^9$, Fig. 21, which is provided with a friction-roller $O^4$, riding upon the cam edge of cam $N^{12}$. The arm $O^9$ is connected with the arm of the chain-ratchet disk P by means of a rod $O^{10}$. When the end of the bearing-arm $O^7$ rides upon either of the flanges $O^6$ of the fashioning-wheel $O^5$, the arm $O^9$ will have been elevated to its highest position and the roller $O^{11}$ raised clear of the edge of cam $N^{12}$; but when said bearing-arm in the course of the revolution of said fashioning-wheel shall have fallen between the ends of the flanges $O^6$ said arm $O^9$ will thereby have been depressed and through roller $O^{11}$ given an up-and-down movement by the cam $N^{12}$, so that according as the bearing-arm $O^7$ rests upon or between the ends of flanges $O^6$ of the wheel $O^5$ the chain-ratchet disk P will remain at rest or be brought into action.

To the inner or front face of the chain-ratchet disk P is pivoted, Figs. 22 and 24, a pawl $P'$, which engages with the teeth of the chain-ratchet $P^2$, which in turn is thus actuated. The disk P is loosely mounted upon the shaft $P^4$; but the ratchet $P^2$ is fixedly mounted thereon, and upon the shaft is also fixedly mounted the chain-wheel $P^3$, so that when the disk P is actuated by the vibrating movement of chain-arm $O^9$ through the agency of connecting-rod $O^{10}$, as before described, the said chain-ratchet $P^2$ and wheel $P^3$ will be actuated. A second wheel $P^5$ is suspended from a standard $P^6$, Figs. 20 and 21, and over said wheels $P^3$ and $P^5$ is passed an endless chain $P^7$, the teeth or lugs of the wheels engaging with the eye of each and every link of the chain. The chain $P^7$, as more particularly shown in Figs. 38, 40, 41, and 42, is made up of three series of links, one series R′ being provided with lugs that actuate a sliding bar P$^{10}$, Fig. 30, another series R$^2$ being provided with lugs to actuate a bar P$^{11}$, while the faces of the third series R are blank, the link, however, having a laterally-projecting wing, as shown in Figs. 38 and 40, such wing being for the purpose of actuating a horn S$^3$, as hereinafter described.

Upon the bed plate or platform L of the supporting-frame of the machine, Fig. 22, and in line with the chain-wheel P$^3$ are the boxes P$^8$ and P$^9$, the box P$^8$, Fig. 30, being provided with the two sliding bars P$^{10}$ and P$^{11}$, which are actuated, as hereinafter described, by the links R′ and R$^2$ of the chain. The bar P$^{11}$ is provided with a downwardly-projecting lug P$^{12}$, while the single bar P$^{13}$ of box P$^9$, Fig. 29, is provided with a like lug, as shown in Fig. 28.

Pivoted at Q$^9$ to a downwardly-projecting portion of the bed-plate L, as shown in Fig. 43, are the arms or levers Q$^{10}$ and Q$^{11}$, which are connected by a rod or bar Q$^{12}$, pivoted as shown. The arm Q$^{10}$ bears at its upper or free end against the lug P$^{12}$ of the sliding bar P$^{11}$, and the arm Q$^{11}$ likewise bears against the lug P$^{12}$ of the bar P$^{13}$, so that for every inward movement of the bar P$^{11}$ a like inward movement is communicated to bar P$^{13}$.

Secured to or rigidly suspended from the under face of the bed-plate L, Fig. 43, is the lifter-bearing Q, in which slides the lifter Q′, the head of the latter being provided with jaws Q$^2$, in which are loosely set the lifter-pawls Q$^3$ and Q$^4$, the confronting faces of which are each provided with a tooth that engages with one of the ratchet-pins Q$^5$, as will presently be described, said pawls, with their respective springs Q$^7$, being caused to bear against the bars P$^{10}$ and P$^{13}$, respectively, by the tension of spring Q$^8$, Fig. 28, said spring serving to throw back the bars P$^{10}$ and P$^{13}$ when said bars are not held in position by the chain. When the lug of a link R′ is brought to bear against the bar P$^{10}$, said bar will be forced inward against the action of the spring on pawl Q$^4$, thereby pressing the latter, with its tooth, toward the ratchet-pins Q$^5$, the edge or portion of the face of said link contiguous to bar P$^{11}$ being blank, so that the latter bar and consequently the bar P$^{13}$ are free to move, and are thrown back clear of said pins Q$^5$ by the tension of the spring Q$^8$; but when one of the links R$^2$ is brought to bear against the bar P$^{11}$ (the portion of the face of said link contiguous to bar P$^{10}$ being blank) the latter bar P$^{11}$ will be actuated, and the motion being communicated by arms or levers Q$^{10}$ and Q$^{11}$ and connecting-rod Q$^{12}$ to the bar P$^{13}$, the latter will be forced inward, pressing the pawl Q$^3$ forward, and thus bringing the tooth of the latter under one of the ratchet-pins Q$^5$, the pawl Q$^4$ being or having been thrown back clear of said pins by the tension of the spring Q$^8$. The blank links R of the chain are so located thereon with respect to the flanges O$^6$ of the fashioning-wheel Q$^5$ that when the bearing-arm O$^7$ rests upon either of said flanges and the chain-operating mechanism is rendered inactive, as before described, one of said links will have been brought contiguous to the box P$^8$, and as a consequence the sliding bars will all be free to move, and the pawls Q$^3$ and Q$^4$ will have both been thrown back clear of the pins Q$^5$ by the spring Q$^8$.

Toward the lower end of the lifter Q′ upon its front face is pivoted, Figs. 28 and 43, a friction-roller Q$^{13}$, which at times rides upon the cam edge of the ratchet cam-disk N$^8$, whereby at said times said lifter, and with it the pawls Q$^3$ and Q$^4$, are given an up-and-down movement. When a link R′ shall have caused the tooth of the pawl Q$^4$ to pass under one of the reciprocating ratchet-pins Q$^5$, the upward movement of the lifter will impart to said pin and the ratchet Q$^6$ a partial turn in one direction, and for every link R′ that is thus caused to hold the pawl Q$^4$ in action there will, on each upward movement of the lifter, be a partial movement of said ratchet in the same direction; but should a link R$^2$ have been brought to bear against the bar P$^{11}$ the tooth of the pawl Q$^3$ will be forced under one of said pins, and as the lifter is elevated the pins and ratchet will be given a partial turn in the contrary direction, which movements will be repeated at every upward movement of the lifter until every link R$^2$ shall have passed the sliding bar P$^{11}$—in other words, by means of the lugs or links R′ and R$^2$ the lifter Q′, its operating devices, and the pawls and other mechanism described, the ratchet Q$^6$ will receive intermittent movements in one direction or the other. The ratchet Q$^6$ is fixedly mounted upon the shaft R$^3$, which also carries the pinion D, hereinbefore referred to, Figs. 10, 22, and 46. Hence these partial movements or revolutions of said ratchet will be communicated to said pinion, and thence to the bars C$^5$ and C$^6$, and eventually to the rings C$^3$ and C$^4$, which are thus given the partial intermittent and consecutive movements or revolutions, first in one direction and then in the other, as and for the purposes hereinbefore set forth. When, however, the bearing-arm O$^7$, Fig. 20, rests upon either of the flanges O$^6$ of the fashioning-wheel O$^5$, as already explained, the chain-operating mechanism will remain at rest, and (a link R of the chain having first been brought into position) the pawls Q$^3$ and Q$^4$ will have their teeth thrown back by the spring Q$^8$, Fig. 28, so as to be clear of the pins Q$^5$ of the reciprocatory ratchet Q$^6$. Hence the latter and the parts controlled thereby will also remain at rest. The lifter Q′ is brought to rest as hereinafter described. The peculiar and special function of the chain, it will thus be evident, is to govern the reciprocation or actuation of the rings C$^3$ and C$^4$, as described, when the head is knitting the heel or toe of a sock or stocking, at which time, as will be understood by those skilled in the construction and operation of knitting-machines of this class, it is necessary to reciprocate the cam-ring B, Fig. 3. The mechanism for this latter purpose will now be described.

Secured to the bed-plate L, Fig. 53, is a sleeve $R^4$, through which passes a shaft $R^5$. To the upper end of said shaft is secured a head and tongue $R^6$, and from said head depend pins $R^7$, Figs. 48 and 50, between which enters the upright spring $R^8$, which may be secured to the base of the sleeve $R^4$ or to the bed-plate L, as shown in Fig. 53; also depending from said head $R^6$ is an arm $R^9$, with which the reciprocatory bar $C^5$ at times engages. The mechanism just described—viz., the shaft $R^5$, head and tongue $R^6$, with its depending pins $R^7$, and arm $R^9$ and the spring $R^8$—constitutes what I denominate a "swinging tappet."

To the lower end of the shaft $R^5$, Fig. 53, is rigidly secured a crank $R^{10}$, to which and to the shifter bar or rod $R^{12}$ is pivoted a connecting-rod $R^{11}$, said bar or rod $R^{12}$ carrying the belt-yoke $R^{14}$, Fig. 54, through which passes the belt $L'$, that runs from the main or driving shaft or pulley, said belt being, as said bar or rod $R^{12}$ is reciprocated, carried from the tight pulley $L^2$ to the loose pulley $L^5$, and vice versa, as hereinafter more fully described. As long as the main belt $L'$ passes over the fixed pulley $L^2$, the shaft $L^3$ and fixed pulley $L^6$ will be continuously rotated, which motion will, by the straight belt $L^7$, Fig. 25, be communicated to the pulley $L^8$ and eventually to the cam-ring B, which will thus be rotated; but should the said main belt $L'$ be shifted to the loose pulley $L^5$ a movement in the contrary direction will be communicated by the cross-belt $L^{10}$ to said pulley $L^8$ and eventually to said cam-ring B, and, accordingly, if said belt $L'$ be alternately shifted from the fixed pulley $L^2$ to the loose pulley $L^5$, and vice versa, the said cam-ring will be actuated first in one direction and then in the other, or, in other words, will be reciprocated.

The tappet before described is so located upon the bed-plate L, Fig. 21, with respect to the ring I of the machine that the spring $R^8$, bearing against one of the pins $R^7$, tends to cause the tongue $R^6$ to bear against the periphery of said ring I, which is made in two sections S and S', Figs. 47, 49, and 51, said tongue $R^6$, when free to act, being pressed by the spring $R^8$ into the space between the ends of said sections, and thus given a partial turn as the ring is revolved in conjunction with the cam-ring B, to which said ring-sections are rigidly secured, as already stated, which turn, being communicated to shaft $R^5$, actuates the shifter-bar $R^{12}$, and the main belt $L'$ is thus moved or shifted from one pulley to the other and the movement of the cam-ring B and ring I thus reversed. Upon such reverse movement the tongue $R^6$ is pressed into the opposite space between the ends of the sections of said ring I, and as the movement of the ring is continued sufficiently said tongue is given a turn in the direction opposite to that previously imparted to it, the belt $L'$ being thereby moved or shifted to its original position and the movement of the cam-ring again reversed.

The action of the tappet will be understood on reference to Figs. 47 to 52, inclusive. When the machine is knitting round and round, the arm $R^6$ of the tappet is held out of contact with the ring I by the action of the bar $C^5$ upon the arm $R^9$ of the tappet, as shown in Figs. 51 and 52. When the machine is about to begin reciprocating work, however, the bar $C^5$ is moved so as to release the tappet, and the latter is then moved under the action of the spring $R^8$, so as to throw the arm $R^6$ into the space between the sections S and S' of the ring I, as shown in Figs. 49 and 50. The ring is supposed to be moving in the direction of the arrow 1, Fig. 49, and the arm $R^6$ is acted upon by the end of the section S of the ring, and is thereby moved to the position shown in Fig. $50^a$, by which time the driving-belt will be shifted and the direction of movement of the machine reversed, as indicated by the arrow 2, Fig. $50^a$. During this reverse movement the arm $R^6$ bears upon the section S' of the ring until the ring has moved a half-turn, as shown in Fig. 47, whereupon the arm $R^6$ will be acted upon by the opposite end of the section S of the ring, and said arm $R^6$ will be moved to the position shown in Fig. $47^a$, so as to reshift the belt and change the direction of movement of the head, as indicated by arrow 1 in said Fig. $47^a$. The arm $R^6$ then bears upon the section S' of the ring until the parts again make a half-revolution and reach the position shown in Fig. 49, when the belt is again shifted, and so on. This shifting of the belt $L'$ and reciprocation of the cam-ring will continue as long as the tongue $R^6$ is free to enter the space between the ends of the sections of ring I. When knitting round and round, the bearing-arm $O^7$, Fig. 20, rests upon the flange $O^6$ of the fashioning-wheel $O^5$, a blank link R of the chain is opposite the box $P^8$, and the chain-operating and reciprocatory ratchet mechanisms are at rest, as before described. The parts are so arranged that when about to knit round and round the reciprocatory bar $C^5$ bears against the arm $R^9$ of the tappet, as before described, thus forcing and holding the tongue $R^6$ away from the periphery of the ring I, as shown in Figs. 51 and 52, the belt $L'$ then passing over the fixed pulley $L^2$ and the cam-ring B being thereby rotated and all the needles of the machine thus actuated.

As already stated, by means of the pin O upon the cam-disk $N^{12}$, Fig. 21, and arm $O'$ actuated or vibrated thereby, the fashioning-wheel $O^5$ is moved a tooth for every revolution of said disk, while the number of revolutions of the cam-ring B for every revolution of said disk $N^{12}$, and consequently for every tooth of the fashioning-wheel $O^5$, is determined by the size of the various gears and pinions that transmit motion from the shaft $M^5$, Fig. 25, to said disk $N^{12}$, so that the length of the tubular fabric knit by the round-and-round operation depends upon the extent of movement of the fashioning-wheel $O^5$, while the bearing-arm $O^7$ rests upon or is supported by the flange $O^6$, and the said cam-ring B may, according as said gearing is varied, be made to make one or more revolutions to every revolution of the disk $N^{12}$ or for every tooth in the forward movement of the fashioning-wheel $O^5$. When, however, the head is knitting to and fro, the reciprocatory movement imparted to the cam-ring B will also be communicated, obviously, to the disk $N^{12}$, and the cam edge, as well as pin O of said disk, is so arranged with respect to the parts actuated thereby that the fashioning-wheel is moved to the extent of a tooth, and (the bearing-arm $O^7$ having dropped between the ends of the flange $O^6$ of said wheel) the chain $P^7$ to the extent of a link for every movement of cam-ring B. Within a few rounds or courses of the completion of a tubular portion of the fabric the flange $O^6$ passes from under the bearing-arm $O^7$, that has been resting thereon during such round-and-round knitting, and said arm thereupon falls. By this fall the roller $O^{11}$, Fig. 21, is enabled to ride upon or follow the cam edge of disk $N^{12}$, and the chain $P^7$ is thus actuated. After the links R shall have been thereby caused to pass the box $P^8$, Figs. 22 and 30, a link $R^2$ will be brought into position to actuate the reciprocatory ratchet mechanism, the tooth of pawl $Q^3$, Fig. 28, being forced under one of the ratchet-pins $Q^5$. The reciprocatory ratchet $Q^6$ and pinion D are thereupon given a partial revolution by lifter $Q'$, and the bar $C^5$, Fig. 21, is withdrawn from arm $R^9$ of the tappet, thus permitting the spring $R^8$ to force the tongue $R^6$ against the outer periphery of the ring I, and as said tongue engages with the ends of the sections S S' of said ring and is thereby actuated the cam-ring B will be reciprocated, as before described. This movement of the pinion D is also communicated through the bars $C^5$ and $C^6$ to the rings $C^3$ and $C^4$, which are thus actuated in conjunction with the cam-ring B, a movement being imparted to said rings $C^3$ and $C^4$ for each movement imparted to said ring B, with the result of first dropping half of the needles out of action and then gradually narrowing the fashioning-set of needles, as before set forth. When the last of the links $R^2$ has passed the bar $P^{11}$ and a link $R'$ is brought to bear against the bar $P^{10}$, the action of the ratchet-disk $Q^6$ and of the rings $C^3$ and $C^4$ will obviously be reversed, and the fashioning-set of needles gradually widened, as before described, the final movement of the bars bringing all of the needles into action. The final movement of the pinion D causes the bar $C^5$ to press against the arm $R^9$, and force the tongue $R^6$ away from the ring I of the machine, and the belt L' having previously been shifted to the tight pulley $L^2$ the cam-ring B will then be rotated.

In addition to the improved mechanism already described for automatically controlling the times or periods, number, and direction of the movements of the actuating cam-ring B and the co-operating parts of the machine, I also provide means for varying the speed at which said cam-ring is actuated— that is to say, means to reciprocate said ring at a slow speed for to-and-fro work and to rotate said ring first at a slow speed and then at high speed for round-and-round work. As the said cam-ring is actuated from shaft $B^4$, Fig. 3, which shaft in turn receives its motion from shaft $M^8$, Fig. 25, it will be evident that the speed at which said shaft $M^8$ is actuated will determine the speed of cam-ring B. Upon shaft $M^5$ are, as already stated, a series of pulleys $M^2$, $M^3$, and $M^4$, the pulleys $M^2$ and $M^4$ being loose, while pulley $M^3$ is fixed.

Upon the shaft $L^9$, rotating with the pulley $L^8$, is a small pulley $L^{11}$ and a large pulley $L^{12}$, a belt M from the pulley $L^{11}$ passing over the loose pulley $M^2$, while a belt M' from the large pulley $L^{12}$ passes over the fixed pulley $M^3$. Hence said fixed pulley $M^3$ is actuated at a high speed; but when, as hereinafter explained, the said belts M and M' are shifted, and the latter is made to pass over loose pulley $M^4$ and the former over the fixed pulley $M^3$, said pulley $M^3$ will receive its motion from small pulley $L^{11}$ and, with shaft $M^5$, will be actuated at a reduced speed, the motion of said pulley $M^3$ and shaft $M^5$ being communicated through pinion $M^6$ and spur-wheel $M^7$ to the shaft $M^8$, thence through bevel-gears $M^9$ and $M^{10}$ to the shaft $B^4$, and ultimately to the cam-ring B. Hence it will be evident that the speed at which the latter is actuated is dependent upon whether the belt M or the belt M' is adapted to the fixed pulley $M^3$, high speed resulting when the belt M' is on the pulley and a lower speed when the belt M is in use. The belts M and M' are automatically shifted at the desired times, as will presently be described.

Pivoted to a downwardly-projecting portion of the bed-plate L, Figs. 28 and 43, is the "rocker-wedge," consisting of the arm $S^2$ with the horn $S^3$ and foot $S^4$, and secured to the frame of the machine and bearing against the rear edge of said arm $S^2$ is a spring $S^5$, which tends to move said arm $S^2$ and foot $S^4$ forward. The foot $S^4$, as shown in Fig. 45, is wedge-shaped, being widest at its forward end and narrowing toward the point where it is joined to the arm $S^2$.

Pivoted to the frame L, Figs. 43 and 44, is the rocker-lever $S^6$, caused to impinge or bear against the foot $S^4$ by a spring $S^7$, Fig. 44, the upper end of said spring being secured to the frame. The lower or free end of the lever $S^6$ plays in a groove of the rocker $S^3$, which is loosely mounted upon the shaft $N^7$, and in addition to said groove is provided with the flanges $S^9$ and $S^{10}$, these latter being preserved in an upright position by a weight $S^{12}$, attached to a strap $S^{11}$, which passes over and is secured to said rocker, as shown. The flanges $S^9$ and $S^{10}$ are of such length that when the lower end of the lifter $Q'$ rests upon either the cam-disk $N^8$ may be actuated without imparting any movement thereto, the friction-roller $Q^{13}$ at such times being elevated just beyond the reach of the outermost portion of the cam edge of said disk $N^8$, the lifter at such times occupying its highest position. The length of the flanges $S^9$ and $S^{10}$ is so proportioned that when the roller $Q^{13}$ is elevated to its highest position by the said cam $N^8$ one of said flanges may be shifted under the end of the lifter $Q'$, as shown in Figs. 43 and 44, and the latter thereby preserved or held in its elevated position, irrespective of the movement of said cam-disk $N^8$, pawls $Q^3$ and $Q^4$, Fig. 28, being raised out of action; but when neither of said flanges supports the lifter $Q'$ the latter falls and the roller $Q^{13}$ rides upon the cam-disk $N^8$, and with said lifter is given an up-and-down movement by the cam edge of said disk, whereby the reciprocatory ratchet $Q^6$ is actuated, as before described. As said ratchet is only actuated while the head is knitting to and fro and the sliding bars $P^{10}$ and $P^{11}$ are moved by the links $R'$ and $R^2$ of the chain, respectively, it follows that one of the flanges of the rocker $S^8$ is only shifted under the end of lifter $Q'$ as the heads are about to resume all round knitting and all the links $R'$ and $R^2$ have passed said sliding bars $P^{10}$ and $P^{11}$. When the heads are knitting to and fro, as already stated, the bearing-arm $O^7$, Fig. 20, will have dropped between the ends of the flanges $O^6$ upon the fashioning-wheel $O^5$, and the roller $O^{11}$, Fig. 21, of arm $O^9$ will be riding upon the cam edge of disk $N^{12}$, and the chain-operating mechanism will thereby be brought into action and the links $R'$ and $R^2$ caused to bear against bars $P^{10}$ and $P^{11}$, respectively. The rocker-wedge $S^2$ $S^3$ $S^4$, being free after the passage of links R, will by its spring $S^5$ be swung upon its pivot and the foot $S^4$ thus thrown forward, the rocker-lever by the tension of its spring $S^7$ following the narrowing edge of said foot $S^4$, so as to shift the rocker $S^8$ along the shaft $N^7$ and force the flange $S^{10}$ of the rocker from under the foot of lifter $Q'$, allowing the latter to fall and coöperate with the chain to actuate the reciprocatory ratchet $Q^6$ and rings $C^3$ and $C^4$, as before described. When, however, the to-and-fro operation of the head is concluded and the links $R'$ and $R^2$ have all passed the sliding bars $P^{10}$ and $P^{11}$, the next movement of the chain brings an elongated link R in position before the bars $P^{10}$ and $P^{11}$. This, as already described, changes the reciprocatory movements of the actuating part of the machine to a rotary movement, and in practice I allow two such links R to be brought into position before a flange $O^6$ of the fashioning-wheel is brought under the bearing-arm $O^7$, Fig. 20. When such a link R passes the bars $P^{10}$ and $P^{11}$, the pawls $Q^3$ and $Q^4$ of the lifter $Q'$, Fig. 28, having been thrown back clear of the ratchet-pins $Q^5$, the ratchet remains at rest. At the same time the lug or elongation of said link R coming in contact with the upwardly-projecting horn $S^3$ of the rocker-wedge, Fig. 28, the latter is thereby depressed, drawing the foot $S^4$ from the lifter $Q'$ and by its widening edge forcing out the rocker-lever $S^6$ and with it the rocker $S^8$, Fig. 44, the parts being so constructed and arranged that at this movement said lifter, having been elevated to its highest position by the outermost portion of the cam edge of disk $N^8$, one of the flanges $S^{10}$ of the said rocker will pass under the foot of said lifter and thus uphold it.

When the head is knitting the heel or toe of a sock or stocking, as will be obvious and as well understood by those skilled in the construction and operation of machines of this class, it is necessary to actuate the parts at a reduced speed and by the proper arrangement of the shifting device, to be described, the fixed pulley $M^3$, Fig. 25, during to-and-fro knitting is actuated by belt M from the small pulley $L^{11}$; but when about to knit round and round the said parts are actuated at a high speed by passing the belt $M'$ from the large pulley $L^{12}$ over said pulley $M^3$, as shown in said Fig. 25, which is accomplished by shifting the arm U, which carries the belt-yokes $U'$ and $U^2$, through which belts M and $M'$ pass, respectively.

Pivoted to the frame of the machine, as shown in Fig. 21, is a bell-crank lever $T^2$, one arm of which is connected with the short arm of the chain-ratchet disk P by means of rod $T'$. To the other arm of said lever $T^2$ is secured a rod $T^3$, to which is attached a "shifter-block" T, said rod $T^3$ being broken and connected by a bow-spring $T^{12}$. This block T plays up and down in an offset or recess of the wedge-block $T^4$, Figs. 31 and 32, and is provided upon its outer face with the beveled lugs or projections $T^7$ and $T^8$, as shown in Figs. 36 and 37, said wedge-block $T^4$ being mounted in a slide or brace $T^{15}$ upon a girth of the frame, as shown. One end of said wedge-block is beveled or wedge-shaped and bears against the friction-roller $T^{10}$, pivoted to the shifter-slide $T^{11}$, and as said block $T^4$ is reciprocated, as hereinafter described, it forces said roller and slide forward and with them the shifter-arm U; but when said block $T^4$ is withdrawn the said roller, slide, and arm are permitted to return to their original positions.

Pivoted to the side of the frame, Fig. 21, is the rocking shifter-arm $T^5$, and to the latter and to the cam disk $N^{12}$ is pivoted a rod $T^9$, said arm $T^5$ being thus rocked or oscillated by the motion communicated from said disk $N^{12}$. Upon the inner face of the upper portion of said arm $T^5$ is a pin $T^6$, Fig. 35, which is located and designed to engage with either of the lugs T⁷ or T⁸ of the block T to shift the wedge-block T⁴ toward or from the shifter-slide T¹¹, said pin engaging with the inner face of lug T⁷ when the block T falls, thereby shifting said wedge-block T⁴ from said slide, and when said block T is raised engaging with the inner face of lug T⁸ to move or shift the block T⁴ toward the slide. Upon the conclusion of the to-and-fro knitting after all of the links R' and R² of the chain have passed the box P⁸, Fig. 22, and a blank link R has been brought into position, the reciprocatory ratchet mechanism, as before explained, is brought to rest, and the lug or extension of said link R pressing down upon horn S³ of the rocker-wedge, the rocker mechanism is thus actuated and a flange of the rocker shifted under the lower end of lifter Q', which, with its pawls Q³ and Q⁴, is thus permanently elevated out of action. When the block T occupies its lowest position, the pin T⁶ of the rocking shifter-arm T⁵ plays over the lug T⁸ of said block and against the inner edge of lug T⁷, the wedge-block T⁴ occupying a position farthest from the shifter-slide T¹¹; but when the block T is being raised the pin T⁶ of said rocking arm T⁵ passes over the top of said lug T⁸, and upon its reverse movement engages with the inner edge thereof, thus carrying or shifting said block T, and with it the wedge-block T⁴, toward the shifter-slide T¹¹, the wedge or beveled end of said block T⁴ forcing said slide T¹¹ against the shifter-arm U, that carries the belt-yokes U' and U², so that the belt M is moved onto the loose pulley M² and the belt M' is moved onto the actuating-pulley M³. Hence the cam-ring B of each head will be actuated at a high speed, as before explained, which high speed is continued during round-and-round knitting. When, however, the proper length of such round-and-round work has been knit, (which is determined by the extent of the flanges O⁶ upon the fashioning-wheel O⁵,) one of said flanges O⁶ passes from under the bearing-arm O⁷, Fig. 20, and the latter is thus allowed to fall, the arm O⁹, Fig. 21, being actuated by the cam edge of the disk N¹², thus operating also the chain-driving mechanism. The fall of the bearing-arm O⁷ and chain-arm O⁹ imparts to the long arm of the chain-ratchet disk P, Fig. 21, a downward movement, which, being communicated to the block T, causes the latter to descend in the offset or recess of the wedge-block T⁴, Fig. 32, and as the rocking shifter-arm T⁵ is rocked the pin T⁶ thereof will come in contact with the inner edge of the lug T⁷ and thus carry said block T and wedge-block T⁴ away from the slides T¹¹, and though the said block T will rise and fall as the disk P is operated, such movement is so momentary as not to cause any change in the position of the wedge-block T⁴, said block, in fact, being only shifted as the bearing-arm O⁷, Fig. 20, is raised or allowed to fall.

To the yoke end of shifter-arm U, Fig. 34, is secured a bar or rod U³, the other end of which is hinged to one arm of the bell-crank lever U⁴, which is pivoted to a portion X² of the frame of the machine, and to the other arm of said lever is attached a weight U⁵, so arranged that when the wedge-block T⁴ has been moved or shifted from the slide T¹¹, as last described, the said weight U⁵, acting through the bell-crank lever U⁴ and rod U³, will cause the shifter-arm U and slide T¹¹ to follow the movement of said block T⁴, and the belt M' will be shifted from the pulley M³ onto the loose pulley M⁴, while the belt M will be shifted from the pulley M² onto the fixed or actuating pulley M³, so that upon the fall of the bearing-arm O⁷, and while the same remains suspended between the ends of the flanges O⁶ of the fashioning-wheel, the various parts will be actuated from said small pulley L¹¹ at a reduced speed. While the number of rotations of the cam-ring B for every movement of the fashioning-wheel O⁵ to the extent of a tooth depends, as hereinbefore stated, upon the ratio in size of the various gears and pinions, it will be evident that the extent of movement of the wheel, while the bearing-arm O⁷ rests upon or is upheld by either of the flanges O⁶, practically determines the length of the tubular portion of the fabric, and, furthermore, that one of the flanges O⁶ is designed to suspend the action of the chain-operating and reciprocatory ratchet mechanism while the head is knitting the leg, and the other flange is designed to suspend the action of said parts while said head is knitting the foot of the sock or stocking, the length of such leg and foot being determined by the number of teeth spanned by their respective flanges. The number of teeth spanned by each space between the ends of the said flanges O⁶ is sufficient to permit one complete operation of the chain P⁷. It will therefore be evident that to vary the length of a sock or stocking it is necessary to vary the number of teeth of the fashioning-wheel accordingly.

The rod T³, Fig. 21, that connects the bell-crank lever T² and the shifter-block T is broken and connected by the bow-spring T³, so as to yield endwise or give should the pin T⁶ of the rocking shifter-arm T⁵ come in contact with the beveled edge of either lug T⁷ or T⁸.

A friction-bearing R¹³, Fig. 20, is used for the purpose of holding the belt-shifting rod R¹², Fig. 54, in the position in which it is placed by the action of the tappet, before referred to, said bearing R¹³ consisting of a lever pivoted to one side of the frame of the machine, through which said rod R¹² projects, this lever having a curved portion provided with a friction-pad (shown by the heavy black line in Fig. 20) for bearing on the rod, the outer end of the lever having a pendent weight, whereby the desired pressure of the friction-pad upon the rod is insured.

As hereinbefore stated, the crank N¹³, Fig. 20, upon the horizontal shaft N³ enables me to actuate the cam-ring B by hand, and by means of a crank $Q^{14}$ upon the outer end of the reciprocatory ratchet-shaft $R^3$, I am in like manner enabled to actuate the bars $C^5$ and $C^6$ and rings $C^3$ and $C^4$ by hand.

In Figs. 20 and 21 I have shown four machines mounted upon the same table or stand L, these machines being numbered 1, 2, 3, and 4, respectively. The machines 2, 3, and 4 are precisely similar to the machine 1, which has before been described in detail, excepting that the ring I of each is made solid instead of in sections, as shown in Fig. 49, inasmuch as its only function in each machine is to hold the cam-ring B down in position, so that the description of said machine 1, embracing Figs. 1 to 19, inclusive, of the drawings, applies as well to any and all of said machines 2, 3, and 4. The said additional machines I so mount upon and secure to the bed-plate L, Figs. 20, 21, and 22, that when the construction shown in Figs. 23 and 46 is used the toothed peripheries of their respective reciprocatory rings $C^3$ and $C^4$ are caused to mesh with the cogs or teeth of the reciprocatory bars $C^5$ and $C^6$, as shown.

To the lower termination of the cam-pinion shaft of the machines 2 and 3, I rigidly secure a bevel-gear, (similar to that mounted upon the lower extremity of the cam-pinion shaft of the machine 1,) which meshes with a corresponding gear upon the horizontal shaft $N^4$. The cam-pinion shaft of the machine 4, however, is merely an upward extension of the shaft $B^4$, (shown in Figs. 20 and 21, and before referred to,) which obtains motion from the shaft $M^8$ through bevel-gears $M^9$ and $M^{10}$, Fig. 25, and which motion, by means of the gears N and N', is communicated to the horizontal shaft $N^4$, Fig. 20, and thence to the cam-pinion shafts of the several machines, as before set forth. Obviously, the jack-actuating cam-rings B of the machines 2, 3, and 4 will be actuated simultaneously with that of the machine 1, and inasmuch as the hereinbefore-described intermittent movements of the reciprocatory bars $C^5$ and $C^6$ will be communicated as well to the reciprocatory rings of the machines 2, 3, and 4 as to those of the machine 1, it follows that by a single-pattern mechanism constructed as described I am enabled to control the operative parts of a series of machines as well of a single machine.

I should hereinbefore have stated that in setting up the machines the various parts are so adjusted that the intermittent movements of the rings $C^3$ and $C^4$ are imparted thereto and the jack-pins E elevated and allowed to fall, and the lifting and needle jacks $A^5 A^4$ brought into and withdrawn from operative connection with the operative cams of the cam-ring B when the needles occupy their lowest position in the needle-bed.

In addition to the mechanism for automatically controlling the actuating parts of each head, I further provide means to start the machine and to bring the same instantly to rest.

Loosely mounted upon the lower portion of the frame, Fig. 20, is the treadle-shaft $U^6$, to which are rigidly secured the treadle-arms $U^7$, carrying the foot-board $U^8$; also, rigidly secured to said shaft $U^6$ is the bell-crank lever W, Fig. 62, one arm of which is provided with a weight W', which tends to elevate said foot-board $U^8$, while the other arm is provided with a pin $W^8$, which, coming in contact with the leg of the frame, as shown in Fig. 20, limits such upward movement of said foot-board.

Upon the shaft $U^6$, Fig. 57, is an outwardly-projecting arm $U^9$, provided with a pin $U^{10}$, which plays under a swinging arm V, which is pivoted to the frame, as shown in said figure, and provided at its forward end with an eye V', through which passes or depends a tightener-rod $V^2$, to which is attached a weight $V^9$. The upper end of said rod $V^2$ is hung from or hinged to the end of the tightener-arm $V^3$, which in turn is pivoted to the bracket $V^4$ of the frame, Figs. 20 and 56, and at its other end carries a pulley $V^5$, which plays upon the belt $L^7$, running from the pulley $L^6$ to the pulley $L^8$, Figs. 25 and 56, tightening said belt as the weighted end of said arm $V^3$ is raised and releasing said belt as said end is depressed. The belt $L^7$ passes so loosely over the pulleys $L^6$ and $L^8$ that unless tightened by said pulley $V^5$ the machine will come to rest.

To the free end of the arm V, Fig. 57, is hinged or pivoted an upwardly-extending rod $V^6$, the upper end of which plays under the lug $V^{10}$ of the tightener-catch $V^7$, which is pivoted to the frame of the machine, and which, in addition to said lug $V^{10}$, is provided with an arm $V^8$, the latter at times engaging with the notch of the tightener-arm $V^3$, as shown in Fig. 56, and, furthermore, with a spring $V^{12}$, which bears against the rod $V^6$ and tends to hold the latter in position.

When the machine is in operation, the parts constituting the above-described device occupy the positions indicated in said Fig. 56, the belt $L^7$ being tightened by the pulley $V^5$, which is depressed, while the weighted end of the arm $V^3$ is elevated and held in that position by the arm $V^8$ of the tightener-catch $V^7$ engaging with the notch of said arm $V^3$, said arm $V^8$ of the tightener-catch being held in such position by the spring $V^{11}$. As already stated, the weight W' of the bell-crank lever W, Figs. 20 and 62, tends to elevate the foot-board $U^8$ of the treadle. By depressing said foot-board, as shown by dotted lines, Fig. 57, the arm $U^9$ will be elevated, and its pin $U^{10}$, playing under the swinging arm V, will in turn elevate the forward or free end of the latter and with it the stopping-rod $V^6$, as shown in Fig. 56, thus throwing the arm $V^8$ of the tightener-catch out of the notch of the tightener-arm $V^3$, and thus rendering the latter free to move. The forward end of the arm will instantly be depressed by the weight $V^9$, attached to the tightener-rod $V^2$, and the pulley end $V^5$ of said arm will be raised and the pressure thus removed from the belt $L^7$, which will then pass loosely over the pulleys $L^6$ and $L^8$ and the operation of the machine will be suspended. When the foot-board $U^8$ is relieved from pressure, the action of the weight $W'$ upon the bell-crank lever W, as already explained, will again elevate said foot-board, the arm $U^9$, Fig. 57, with its pin $U^{10}$, will be depressed, and the swinging arm V, with the stopping-rod $V^6$, will be allowed to drop to their first-described positions. When it is desired to bring the machine into action, pressure is again applied to the foot-board $U^8$ and the swinging arm V elevated, as before described; but the foot-board $U^8$ is now depressed until the said arm V in its upward movement along the tightener-rod $V^2$, Fig. 57, encounters the nut or lug $V^{13}$ upon the same, and the said upward movement being continued said rod will thereby be lifted, thus elevating the notched or weighted end of the tightener-arm $V^3$ and forcing the pulley $V^5$, Fig. 56, down upon the belt $L^7$, the said weighted end of arm $V^3$ being thus elevated sufficiently to enable the spring $V^{11}$ to throw the arm $V^8$ of the tightener-catch $V^7$ into the notch of said arm $V^3$, as shown in Fig. 56. The belt $L^7$ will thus be tightened sufficiently to admit of motion being communicated from the pulley $L^6$ to the pulley $L^8$, and thus finally to the actuating parts of each machine, as before described. This last upward movement of the swinging arm V will have caused the rod $V^6$ to escape and pass by the lug $V^{10}$ of the tightener-catch $V^7$; but when the pressure is removed from foot-board $U^8$ and the latter is returned to its original elevated position by the weighted bell-crank lever W, the free end of the swinging arm V will again fall and with it the stopping-rod $V^6$, the latter, by the tension of the spring $V^{12}$, Fig. 56, being forced under the lug or projection $V^{10}$ of the tightener-catch. The various parts, in fact, will be again brought into the positions first described, and indicated in Figs. 56 and 57.

In addition to the device just described for instantly stopping and starting the machine, I have also provided mechanism whereby, in combination with the fashioning-wheel, it may be automatically brought to rest at any predetermined point or moment. Properly located upon the inner face of said fashioning-wheel $O^5$, Figs. 59 and 60, is a pin $W^2$, which, as said wheel is rotated or revolved, comes in contact with a small crank $W^5$, which is secured to the outer end of the shaft $W^4$, said shaft being mounted in a bracket $W^3$ upon the side of the frame of the machine, as shown in Fig. 20. Upon the inner end of said shaft is secured a second crank $W^6$, to which in turn is pivoted, Fig. 61, the automatic stopping-rod $W^7$, which passes through and is supported by a portion of the frame, Fig. 20. The free end of said rod bears against the arm $V^8$ of the tightener-catch $V^7$, when the parts occupy the positions indicated in Fig. 56. When the pin $W^2$ upon said fashioning-wheel comes in contact with the small crank $W^5$, the latter, as said pin passes, is given a turn, which, being communicated through the shaft $W^4$, Fig. 61, to the large crank $W^6$, the said rod $W^7$ will be given a movement in the direction of said tightener-catch $V^7$ and the said arm $V^8$ thereof forced out of the notch of the tightener-arm $V^3$, the notch end of which will be instantly depressed by the weight $V^9$, attached to the rod $V^2$, while the pulley $V^5$ is simultaneously raised from the belt $L^7$, thus releasing the latter and bringing the machine to rest, as before described. The object of this automatic arrangement is principally to bring the machine to rest upon the completion of a sock or stocking, to remove which from each head it is only necessary to cut the thread or yarn that is fed to the needles by the usual yarn-carrier, when, by a final revolution of the cam-ring B, such sock or stocking will drop from each head.

I also provide the fashioning-wheel with such a pin $W^2$ at the point at which it may be desired to bring the machine to rest to admit of the auxiliary plate $H^5$ of the loop-adjuster being shifted to supply the needles with a loose or slack course, this course being supplied by a single revolution of the cam-ring B, which is effected by a turn of crank $N^{13}$, and after the said auxiliary plate has been retracted the foot-board of the treadle may be depressed and the operation may be resumed. This loose or slack course of loops or stitches is knit at the point of the sock or stocking after the completion of the toe at which the same is to be closed, and is to facilitate that operation, which may be done by hand or upon any of the various seaming-machines. This point marks the completion of such sock or stocking, though I provide the fashioning-wheel with a few extra teeth, and thus knit a few additional courses of web, as usual, before the machine is again automatically brought to rest and the said socks or stockings cast off, as before described.

Having thus described my invention, I claim and desire to secure by Letters Patent—

1. The combination of the needle-bed and its needles, some of which are fashioning-needles, the needle-operating cams, the reciprocating jacks connected to the needles and constructed to engage with said cams, supporting-jacks for the reciprocating jacks of the fashioning-needles, an expanding and contracting cam, and means whereby said cam is caused to act upon the supporting-jacks of the fashioning-needles so as to move the reciprocating jacks into and out of engagement with the needle-operating cams, all substantially as specified.

2. The combination of the needle-bed and its needles, some of which are fashioning-needles, the needle-operating cams, the reciprocating jacks connected to the needles and movable into and out of engagement with said cams, supporting-jacks for the reciprocating jacks of the fashioning-needles, pins acting on said supporting-jacks, and an expanding and contracting cam acting on said pins, all substantially as specified.

3. The combination of the needle-bed and its needles, the needle-actuating cams, jacks connected to said needles and movable into and out of engagement with the cams, an expanding and contracting cam, and means whereby individual jacks may be acted upon thereby, a ring whereby a number of jacks may be acted upon simultaneously, and means whereby said ring is actuated by said expanding and contracting cam, all substantially as specified.

4. The combination of the needle-bed and its needles, the needle-operating cams, the reciprocating jacks movable into and out of engagement with said cams, the supporting-jacks, the lifting and ring pins, and the jack-ring with an expanding and contracting cam adapted to actuate said lifting and ring pins, whereby some of the needles may be simultaneously and others singly withdrawn from or brought into action, all substantially as specified.

5. The combination, with the cam-ring B, having the sectional ring I rigidly secured thereto, and the main or driving belt L', of a series of tight and loose pulleys $L^2$, $L^5$, and $L^6$, straight belt $L^7$, cross-belt $L^{10}$, pulley $L^8$, mechanism to communicate motion from said pulley $L^8$ to said cam-ring B, a swinging tappet adapted to be operated by said sectional ring, a belt-shifter, and connecting mechanism intermediate of said tappet and belt-shifter, all constructed and arranged substantially as shown and described.

6. The combination of a radially-arranged series of needles, a cam-ring adapted to reciprocate the same, a vertically-arranged series of hook-jacks provided each with a hook, a hook-cam cylinder adapted to actuate said hook-jacks in the direction of their length, and mechanism to impart motion to said cam-ring and hook-cam cylinder, the said several parts being constructed and arranged to operate substantially as set forth.

7. The combination, with the hook-jacks and cam-ring, of an adjustable plate secured to said ring and constructed and arranged, substantially as shown and described, whereby the length of the loops and the texture of the fabric may be regulated and determined, as set forth.

8. The combination, with the cam-ring and the operating-cams thereof, of a spring provided with a lobe located upon each side of the said operating-cams and arranged to ride over and upon the needle-jacks, as shown and described, whereby all unsupported jacks are forced out of operative connection with said cams, as set forth.

JOHN R. BRIDGES.

Witnesses:
F. P. BUCKLEY,
ALBERT E. ZACKBULL.

Correction in Letters Patent No. 440,415.

It is hereby certified that Letters Patent No. 440,415, granted November 11, 1890, upon the application of John R. Bridges, of Philadelphia, Pennsylvania, for an improvement in "Circular Knitting Machines," was erroneously issued to said Bridges as owner of the entire interest in said invention; that said Letters Patent should have been issued to the *S. B. Wilkins Company, of Rockford, Illinois,* said S. B. Wilkins Company being owner of the entire interest therein as shown by the record of assignments in this Office; and that said Letters Patent should be read with this correction therein that the same may conform to the record of the case in the Patent Office.

Signed, countersigned, and sealed this 17th day of February, A. D. 1891.

[SEAL.]

CYRUS BUSSEY,
*Assistant Secretary of the Interior.*

Countersigned:
C. E. MITCHELL,
*Commissioner of Patents.*